United States Patent
Chino et al.

[11] Patent Number: 6,118,888
[45] Date of Patent: Sep. 12, 2000

[54] MULTI-MODAL INTERFACE APPARATUS AND METHOD

[75] Inventors: Tetsuro Chino; Tomoo Ikeda; Yasuyuki Kono; Takehide Yano, all of Hyogo-ken; Katsumi Tanaka, Osaka-fu, all of Japan

[73] Assignee: Kabushiki Kaisha Toshiba, Kawasaki, Japan

[21] Appl. No.: 09/030,213

[22] Filed: Feb. 25, 1998

[30] Foreign Application Priority Data

| Feb. 28, 1997 | [JP] | Japan | 9-046752 |
| Mar. 17, 1997 | [JP] | Japan | 9-062681 |
| Nov. 6, 1997 | [JP] | Japan | 9-303953 |

[51] Int. Cl.[7] ................................................. G06K 9/00
[52] U.S. Cl. .................... 382/118; 345/336; 345/358
[58] Field of Search ................... 382/100, 103, 382/117, 118, 115, 325, 311; 345/173, 175, 358, 336, 337, 338, 978, 473, 326, 327; 348/78, 169–172; 340/825.34; 704/275; 463/34

[56] References Cited

U.S. PATENT DOCUMENTS

| 4,513,317 | 4/1985 | Ruoff, Jr. ................................. 358/133 |
| 4,755,045 | 7/1988 | Borah et al. ............................ 351/210 |
| 5,008,946 | 4/1991 | Ando ......................................... 382/2 |
| 5,323,470 | 6/1994 | Kara et al. .................................. 382/1 |
| 5,367,454 | 11/1994 | Kawamoto et al. .................... 364/419 |
| 5,454,043 | 9/1995 | Freeman ................................. 382/168 |
| 5,566,271 | 10/1996 | Tomitsuka et al. .................... 395/2.84 |
| 5,731,805 | 3/1998 | Tognazzini et al. .................... 345/156 |
| 5,801,704 | 9/1998 | Oohara et al. ........................... 345/358 |
| 5,859,642 | 1/1999 | Jones ....................................... 345/352 |
| 5,880,731 | 3/1999 | Liles et al. .............................. 345/349 |

OTHER PUBLICATIONS

Koons et al.; "Integrating Simultaneous Input From Speech, Gaze, and Hand Gestures", Mark T. Mayburg (Eds), Intelligent Multimedia Interfaces, AAAI Press/The MIT Press, 1993, pp. 257–276.

Boll et al.; "Suppression Of Acoustic Noise In Speech Using Spectral Subtraction", IEEE Transactions on Acoustics, Speech and Signal Processing, vol. ASSP–27, No. 2, Apr. 1979, pp. 113–120.

Cipolla et al. "Uncalibrated Stereo Vision With Pointing For a Man–Machine Interface", MVA '94 IAPR Workshop on Machine Vision Applications, Dec. 13–15, 1994, Kawasaki, pp. 163–166.

(List continued on next page.)

*Primary Examiner*—Leo H. Boudreau
*Assistant Examiner*—Brian P. Werner
*Attorney, Agent, or Firm*—Finnegan, Henderson, Farabow, Garrett & Dunner, L.L.P.

[57] ABSTRACT

In the multi-modal interface apparatus of the present invention, a gaze object detection section always detects a user's gaze object. The user inputs at least one medium of sound information, character information, image information and operation information through a media input section. In order to effectively input and output information between the user and the apparatus, a personified image presentation section presents a personified image to the user based on the user's gaze object. A control section controls a reception of the inputted media from the media input section based on the user's gaze object.

29 Claims, 26 Drawing Sheets

OTHER PUBLICATIONS

Hatfield et al., Principles and Guidelines for the Design of Eye/Voice Interaction Dialogs, IEEE publication, pp. 10–19, Aug. 1996.

Stiefelhagen et al., A Model–Based Gaze Tracking System, IEEE publication, pp. 304–310, Jul. 1996.

Thomas E. Hutchinson, Eye–Gaze Computer Interfaces, IEEE publication, pp. 65–66, Jul. 1993.

Wang et al., Integration of Eye–Gaze, Voice and Manual Response in Multimodal User Interface, IEEE publication, pp. 3938–3942, Jan. 1995.

Colombo et al., Prototype of a Vision–Based Gaze–Driven Man–Machine Interface, IEEE publication, pp. 188–192, Apr. 1995.

Hara et al., Real–Time Facial Interaction Between Human and 3D Face Robot Agent, IEEE publication, pp. 401–409, Sep. 1996.

Maes et al., The Alive System: Full–Body Interaction with Autonomous Agents, IEEE publication, pp. 11–18, Feb. 1995.

Koda et al., Agents with Faces: The Effect of Personification, IEEE publication, pp. 189–194, Sep. 1996.

Mori et al., A Multi–Purpose Dialogue Management System Employing Visual Anthropomorphous Agent, IEEE publication, pp. 187–192, 1995.

Hutchinson et al., Human–Computer Interaction Using Eye–Gaze Input, IEEE publication, pp. 1527–1534, 1989.

Saeyor et al., NURBS–Based Facial Expression Modeling for Anthropomorphic Interface Agent, IEEE publication, pp. 395–400, Sep. 1996.

Hasegawa et al., Realtime Synthesis of Moving Human–Like Agent in Response to User's Moving Image, pp. 39–42, Aug. 1992.

Miyashita et al., A Face to Face Communication using Real–Time media Conversion System, IEEE publication, pp. 543–544, Sep. 1996.

Hasegawa et al., Real–Time Parallel and Cooperative Recognition of Facial Images for an Interactive Visual Human Interface, IEEE publication, pp. 384–387, 1994.

Hiramoto et al., A Speech Dialogue Management System for Human Interface employing Visual Anthropomorphous Agent, IEEE publication, pp. 277–282, Jun. 1994.

Pierre Wellner, The DigitalDesk Calculator: Tangible Manipulation on a Desk Top Display, UIST'91 Conference, pp. 27–33, Nov. 1991.

| GAZE OBJECT ID | GAZE OBJECT NAME | TIME |
|---|---|---|
| P 101 | PERSONIFIED IMAGE | t 3 |
| : | : | : |
| P 102 | OTHER PERSON | t10 |
| : | : | : |
| P 103 | OTHER PERSON | t15 |
| : | : | : |
| P 104 | OUTPUT AREA | t18 |
| : | : | : |
| P 105 | OTHER PERSON | t20 |
| : | : | : |
| P 106 | OUTPUT AREA | t22 |
| : | : | : |
| P 201 | SCREEN OUTSIDE AREA | txx |
| : | : | : |
| P 202 | INPUT REQUEST AREA | tyy |
| : | : | : |
| P 204 | OUTPUT REQUEST AREA | tzz |
| : | : | : |
| P 205 | CANCEL REQUEST AREA | tww |
| : | : | : |

*FIG. 2*

| RULE ID | PRESENT STATUS INFORMATION | EVENT CONDITION INFORMATION | ACTION INFORMATION | NEXT STATUS INFORMATION |
|---|---|---|---|---|
| Q1 | INPUT/OUTPUT WAITING | INPUT REQUEST | [INPUT RECEIPT FB/ INPUT RECEIPT START] | ON INPUT |
| Q2 | INPUT/OUTPUT WAITING | OUTPUT CONTROL RECEIVING | [] | ON CONFIRMATION |
| Q3 | INPUT/OUTPUT WAITING | OUTPUT START REQUEST | [OUTPUT START] | ON OUTPUT |
| Q4 | INPUT/OUTPUT WAITING | OUTPUT PREPARATION REQUEST | [OUTPUT OR NOT] | ON PREPARATION |
| Q5 | ON INPUT | INPUT COMPLETION | [INPUT RECEIPT STOP/ INPUT COMPLETION FB] | INPUT/OUTPUT WAITING |
| Q6 | ON INPUT | CANCEL REQUEST | [INPUT RECEIPT STOP/ CANCEL FB] | INPUT/OUTPUT WAITING |
| Q7 | ON INPUT | INPUT TIME-OUT | [INPUT RECEIPT STOP/ CANCEL FB] | INPUT/OUTPUT WAITING |
| Q8 | ON CONFIRMATION | OUTPUT POSSIBLE | [OUTPUT START] | ON OUTPUT |
| Q9 | ON CONFIRMATION | OUTPUT IMPOSSIBLE | [CALL] | ON CALLING |
| Q10 | ON OUTPUT | OUTPUT COMPLETION | [] | INPUT/OUTPUT WAITING |
| Q11 | ON OUTPOUT | INTERRUPTION REQUEST | [OUTPUT INTERRUPTION] | ON INTERRUPTION |
| Q12 | ON INTERRUPTION | RESTART POSSIBLE | [OUTPUT RESTART] | ON OUTPUT |
| Q13 | ON INTERRUPTION | INTERRUPTION TIME-OUT | [OUTPUT STOP / CANCEL FB] | INPUT/OUTPUT WAITING |
| Q14 | ON CALLING | CONFIRMATION DETECTION | [CONFIRMATION RECEIPT FB/OUTPUT START] | ON OUTPUT |
| Q15 | ON CALLING | CALLING TIME-OUT | [CANCEL FB] | INPUT/OUTPUT WAITING |

*FIG. 7*

| RULE ID | PRESENT STATUS INFORMATION | GAZE OBJECT INFORMATION | KIND OF INPUT/OUTPUT INFORMATION | INTERPRETATION RESULT INFORMATION |
|---|---|---|---|---|
| R1 | INPUT/OUTPUT WAITING | INPUT REQUEST AREA | (CORRESPONDING INFORMATION) | INPUT REQUEST |
| R2 | INPUT/OUTPUT WAITING | PERSONIFIED IMAGE | SOUND INFORMATION | INPUT REQUEST |
| R3 | INPUT/OUTPUT WAITING | MIC AREA | SOUND INFORMATION | INPUT REQUEST |
| R4 | INPUT/OUTPUT WAITING | CAMERA AREA | VISUAL INFORMATION | INPUT REQUEST |
| R5 | INPUT/OUTPUT WAITING | OUTPUT REQUEST AREA | DYNAMIC IMAGE INFORMATION | OUTPUT PREPARATION |
| R6 | INPUT/OUTPUT WAITING | OUTPUT REQUEST AREA | EXCEPT FOR DYNAMIC IMAGE INFORMATION | OUTPUT REQUEST |
| R7 | ON INPUT | CANCEL REQUEST AREA | ---- | CANCEL REQUEST |
| R8 | ON CONFIRMATION | OUTPUT REQUEST AREA | STILL IMAGE INFORMATION | OUTPUT POSSIBLE |
| R9 | ON CONFIRMATION | EXCEPT FOR OUTPUT REQUEST AREA | STILL IMAGE INFORMATION | OUTPUT IMPOSSIBLE |
| R10 | ON CONFIRMATION | OUTPUT REQUEST AREA | DYNAMIC IMAGE INFORMATION | OUTPUT POSSIBLE |
| R11 | ON CONFIRMATION | EXCEPT FOR OUTPUT REQUEST AREA | DYNAMIC IMAGE INFORMATION | OUTPUT IMPOSSIBLE |
| R12 | ON CONFIRMATION | OTHER PERSON | SOUND INFORMATION | OUTPUT IMPOSSIBLE |
| R13 | ON CONFIRMATION | EXCEPT FOR OTHER PERSON | SOUND INFORMATION | OUTPUT POSSIBLE |
| R14 | ON OUTPUT | EXCEPT FOR OUTPUT AREA | DYNAMIC IMAGE INFORMATION | INTERRUPTION REQUEST |
| R15 | ON OUTPUT | OTHER PERSON | SOUND INFORMATION | INTERRUPTION REQUEST |
| R16 | ON PREPARATION | OUTPUT AREA | DYNAMIC IMAGE INFORMATION | START POSSIBLE |
| R17 | ON PREPARATION | FRONT OF APPARATUS | SOUND INFORMATION | START POSSIBLE |
| R18 | ON PREPARATION | SPEAKER AREA | SOUND INFORMATION | START POSSIBLE |
| R19 | ON INTERRUPTION | OUTPUT AREA | DYNAMIC IMAGE INFORMATION | RESTART POSSIBLE |
| R20 | ON INTERRUPTION | FRONT OF APPARATUS | SOUND INFORMATION | RESTART POSSIBLE |
| R21 | ON INTERRUPTION | SPEAKER AREA | SOUND INFORMATION | RESTART POSSIBLE |
| R22 | ON CALLING | OUTPUT AREA | VISUAL INFORMATION | CONFIRMATION DETECTION |
| R23 | ON CALLING | PERSONIFIED IMAGE | SOUND INFORMATION | CONFIRMATION DETECTION |
| ⋮ | ⋮ | ⋮ | ⋮ | ⋮ |

*FIG. 8*

| TIMING | STATUS REGISTER S | INFORMATION KIND REGISTER M | MEMO |
|---|---|---|---|
| $t_0$ | INPUT/OUTPUT WAITING | UNDEFINED | SOUND IS NOT RECEIVED. |
| $t_1$ | INPUT/OUTPUT WAITING | UNDEFINED | NOISE GENERATION → NO ERROR ACTIVATION. |
| $t_2$ | INPUT/OUTPUT WAITING | UNDEFINED | USER GAZES THE PERSONIFIED IMAGE |
| $t_3$ | INPUT/OUTPUT WAITING | UNDEFINED | A GAZE OBJECT INFORMATION (P101) IS OUTPUTTED. |
| $t_4$ | INPUT/OUTPUT WAITING | UNDEFINED | AN INTERPRETATION RULE (R2) IS OBTAINED. |
| $t_5$ | INPUT/OUTPUT WAITING | UNDEFINED | AN INTERPRETATION RESULT "INPUT REQUEST" IS OBTAINED. |
| $t_6$ | INPUT/OUTPUT WAITING | UNDEFINED | A CONTROL RULE Q1 IS SELECTED. |
| $t_7$ | ON INPUT | UNDEFINED | INPUT RECEIPT FB IS PRESENTED & INPUT RECEIPT STARTS. |
| $t_8$ | INPUT/OUTPUT WAITING | UNDEFINED | INPUT COMPLETION → A CONTROL RULE Q5 IS SELECTED. |
| $t_9$ | INPUT/OUTPUT WAITING | UNDEFINED | OTHER PERSON IS NEAR → THE USER LOOKS THE OTHER PERSON |
| $t_{10}$ | INPUT/OUTPUT WAITING | UNDEFINED | A GAZE OBJECT INFORMATION (P102) IS OUTPUTTED. |
| $t_{11}$ | INPUT/OUTPUT WAITING | UNDEFINED | A CORRESPONDING INTERPRETATION RULE IS NOT SEARCHED. |
| $t_{12}$ | INPUT/OUTPUT WAITING | UNDEFINED | OUTPUT CONTROL SIGNAL IS SUPPLIED. |
| $t_{13}$ | INPUT/OUTPUT WAITING | UNDEFINED | A CONTROL RULE Q2 IS SELECTED. |
| $t_{14}$ | ON CONFIRMATION | DYNAMIC IMAGE | CONTROL PROCESSING TO EXECUTE IS NOT EXISTED. |
| $t_{15}$ | ON CONFIRMATION | DYNAMIC IMAGE | A GAZE OBJECT INFORMATION (P103) IS OUTPUTTED. |
| $t_{16}$ | ON CONFIRMATION | DYNAMIC IMAGE | "OUTPUT IMPOSSIBLE" IS OBTAINED BY INTERPRETATION RULE (R11). |
| $t_{17}$ | ON CALLING | DYNAMIC IMAGE | CALLING FOR THE USER IS EXECUTED. |
| $t_{18}$ | ON CALLING | DYNAMIC IMAGE | THE USER GAZES AN OUTPUT AREA. |
| $t_{19}$ | ON OUTPUT | DYNAMIC IMAGE | THE DYNAMIC IMAGE BEGINS TO BE OUTPUTTED. |
| $t_{20}$ | ON OUTPUT | DYNAMIC IMAGE | THE USER GAZES ANOTHER PERSON DURING OUTPUT OF THE DYNAMIC IMAGE. |
| ⋮ | ⋮ | ⋮ | ⋮ |
| $t_{21}$ | ON INTERRUPTION | DYNAMIC IMAGE | THE OUTPUT IS INTERRUPTED. |

*FIG. 10*

| STORE ADDRESS | LABEL INFORMATION A | REPRESENTATIVE POSITION INFORMATION B | DIRECTION INFORMATION C |
|---|---|---|---|
| ... | ... | ... | ... |
| P1 | PRESENTATION POSITION 1 | (10, 20, 40) | (10, 0, 1) |
| ... | ... | ... | ... |
| P2 | PRESENTATION POSITION 2 | (-20, 0, 30) | (10, 10, 1) |
| ... | ... | ... | ... |
| P3 | USER'S FACE | (40, 30, 50) | (-4, -3, -10) |
| ... | ... | ... | ... |
| P4 | USER'S FINGER END 1 | (40, 10, 20) | (-1, -1, -1) |
| ... | ... | ... | ... |
| P5 | USER'S FINGER END 2 | (20, 10, 20) | (-1, -1, -1) |
| ... | ... | ... | ... |
| P6 | USER'S FINGER END 3 | (42, 11, 18) | ? |
| P7 | USER'S FINGER END 4 | (44, 14, 16) | ? |
| ... | ... | ... | ... |
| P8 | POINTED OBJECT 1 | (30, 0, 10) | ? |
| ... | ... | ... | ... |
| P9 | POINTED OBJECT 2 | (0, -10, 0) | ? |
| ... | ... | ... | ... |

*FIG. 15*

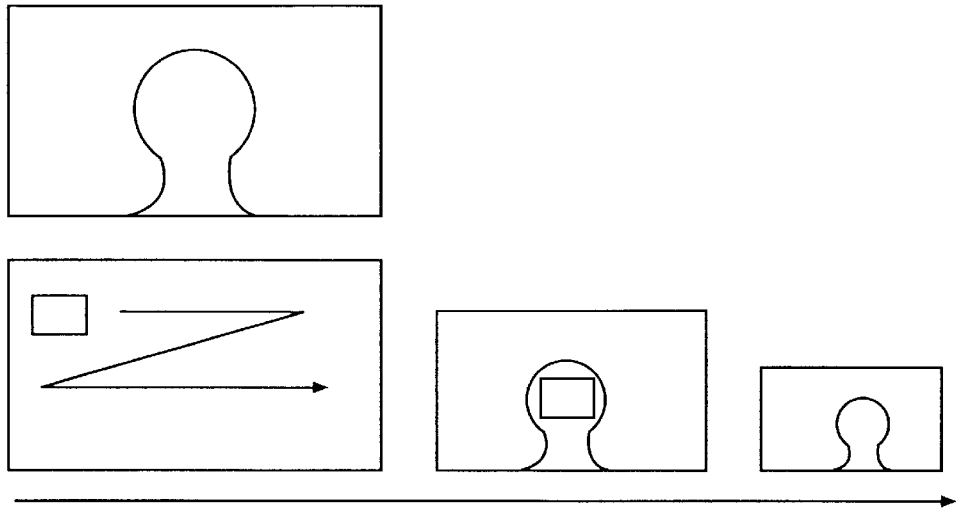
FIG. 21
  
FIG. 22A  FIG. 22B  FIG. 22C
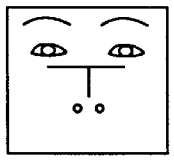 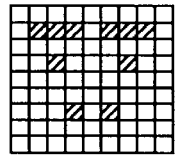 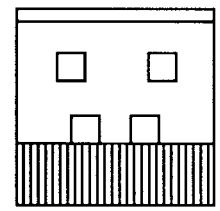
FIG. 22D  FIG. 22E  FIG. 23A
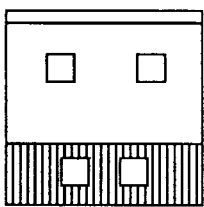 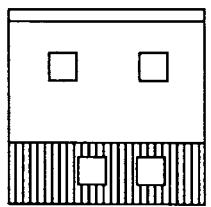 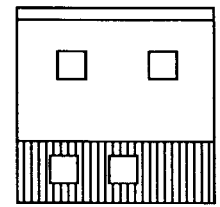
FIG. 23B  FIG. 23C  FIG. 23D

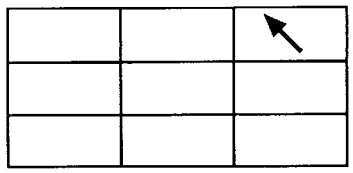
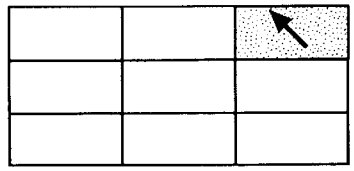
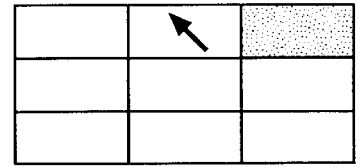
FIG. 32A  FIG. 32B  FIG. 32C
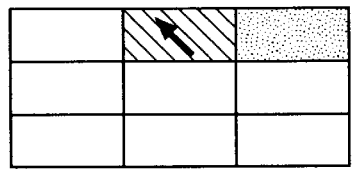
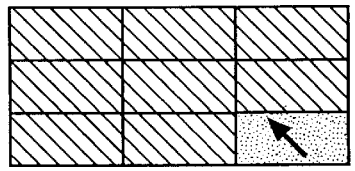
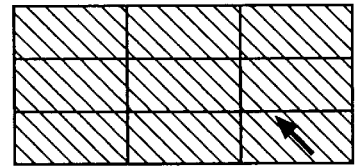
FIG. 32D  FIG. 32E  FIG. 32F
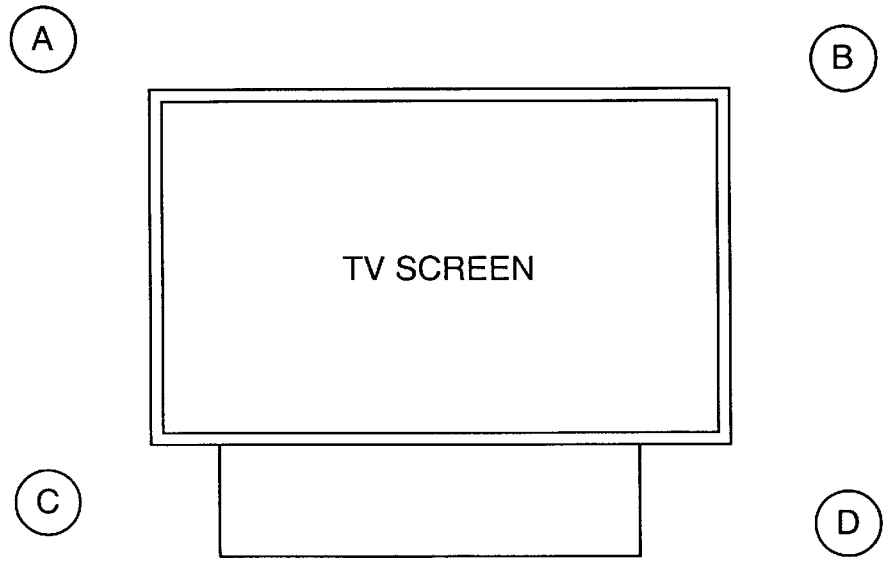
FIG. 33

MULTI-MODAL INTERFACE APPARATUS AND METHOD

FIELD OF THE INVENTION

The present invention relates to a multi-modal interface apparatus and a method to effectively interact between a user and a computer system by detecting the user's gaze object.

BACKGROUND OF THE INVENTION

Recently, in the computer system such as a personal computer, in addition to input by a keyboard or a mouse and output character/image by a display, multi-media information such as sound and image is able to be inputted and outputted. In this situation, by development of natural language analysis, speech recognition and speech synthesis technique, a speech interaction system to interact to the user by speech input/output is required. Furthermore, in addition to the speech input/output, visual information of the user is inputted by a camera. By using various kinds of input/output device such as a touch panel, a pen, a tablet, a data glove, a foot switch, a head-mount display, a force display, a multi-modal interface system to interact to the user is required.

In short, by using the multi-modal interface system including various kinds of input/output device, the user can naturally interact to the computer system. The multi-modal interface system is effective method to realize a natural useful human-interface for the user.

Concretely speaking, in a dialogue between two persons, a communication is not executed by one media (for example, speech) only. The person speaks by using non-verbal message such as gesture and looks (facial expression) as natural interaction. Therefore, in order to realize natural useful human-interface, except for the speech input/output, realization of interaction by using the non-verbal message of various kinds of input/output media such as the touch panel, the pen, the tablet, the data glove, the foot switch, the head mount display, the force display, is expected.

However, analysis accuracy of input from each media is low and characteristics of input/output media is not sufficiently clear. Therefore, the multi-modal interface apparatus to effectively use a plurality of input/output media and reduce the user's load is not realized yet. For example, in recognition processing of speech input, error recognition is occurred by ambient noise of the speech input. In recognition processing of gesture input, signal which the user intends to act as an input message is mistakenly detected from signals orderly inputted through the input media. As a result, error operation is occurred and the user's load increases.

The user inputs speech or gesture to the multi-media interface apparatus as his intention input. However, the user often speaks or acts gesture to other person neighboring the interface apparatus. In this case, the interface apparatus mistakenly recognizes the user's speech or gesture as input signal to the interface apparatus. As a result, error operation to the interface apparatus is occurred. The user must cancel the error operation to the interface apparatus. In order to avoid this situation, the user must pay attention to the input of the interface apparatus.

In the above case that the recognition of the input signal is not necessary, the multi-modal interface apparatus continuously recognizes the input signal. Therefore, processing speed of other service and use efficiency falls down because of processing load of the recognition. In order to solve this problem, the user often indicates a special operation for recognition mode, i.e., button push or menu selection. However, this special operation is not originally necessary in conversation between humans as an unnatural interface operation. In this case, the user's load also increases. For example, in case of selection by button operation for speech input mode, merit of the speech media is not given full play. In short, the input of the speech media can originally communicate by user's mouse only. Even if the user is working by his hand, his work is not disturbed while he speaks to the interface apparatus. However, if the user operates the button selection for the speech input mode, original merit of the speech media is not given full play.

In communication between humans, the non-language message such as eye-contact, gaze position, gesture and looks is very important to smoothly communicate. However, in the multi-modal interface apparatus of the prior art, the non-language message is not used at all. For example, in the multi-modal interface apparatus, output information such as dynamic image, characters over a plurality of screens, continuously changes on the display. In this case, if the user does not pay attention to the display, he can not receive all or part of the presented information. In case changeable information is presented to the user, predetermined volume of the information which the user can receive at one time is only presented. When the user indicates update operation, next volume of the information is presented. However, in this case, the user's load also increases because of confirmation operation. The user often be puzzled at the operation and operational efficiency of the system falls down.

As for different problem of the multi-modal interface apparatus of the prior art, processing of the touch sensor input, the image input and the distance sensor input is explained. In case the user inputs a pointing gesture through the touch sensor, a pointed object is identified by output information of the touch sensor, i.e., coordinate data, time series data, input pressure data, or input time interval. In case of the image input, for example, an image of the user's hand is inputted by using one or plural cameras. A shape or an action of the hand is analyzed by a method disclosed in "Uncalibrated Stereo Vision With Pointing for a Man-Machine Interface (R.Cipolla, et. al., Proceedings of MVA' 94, IAPR Workshop on Machine Vision Application, pp. 163–166, 1994)". In short, the user can indicate the object in real world or on the display by the gesture input. In case of the distance sensor by using an infrared ray, a position, the shape and the action of the user's hand is analyzed and recognized. Therefore, in same way of the image input, the user can indicate the object by the gesture input.

However, in the interface method to detect the shape, the position or the movement of the user's hand by using the camera, sufficient fine degree of detection is not obtained. In short, a gesture which the user intends to input is not correctly recognized. Otherwise, the shape or the movement of the hand which the user does not intend to input is mistakenly extracted as the gesture. As a result, erroneus activation generated by erroneus recognition is necessary to be corrected. In case the gesture which the user intends to input is not correctly inputted to the system, the user must input the gesture again and the user's load greatly increases.

The gesture input of the user is firstly inputted to the system when the gesture is completely analyzed by the system. Therefore, while the user is inputting the gesture by his action, he can not understand whether the system correctly recognizes the gesture input. For example, start timing of the gesture is not correctly detected by the system. As a result, erroneus recognition is executed and the user must input the gesture to the system again. Otherwise, even if the user is not inputting the gesture by his action, the system mistakenly recognizes the user's unconscious action as the gesture and executes erroneus activation. In this case, the user must correct the affect of the erroneus activation.

Furthermore, the gesture recognition method by using an input device of touch system such as the touch sensor, the user indicates a part of the input device itself. Therefore, he can not input a pointing gesture to indicate object in real world except for the input device. On the other hand, in the recognition method of the pointing gesture input by using untouch system such as the camera or the infrared ray sensor, the user can indicate the object or the place in the real world. However, the system can not properly inform the indicated object or place to the user while he is inputting the gesture to point the object or the place.

SUMMARY OF THE INVENTION

It is an object of the present invention to provide a multi-modal interface apparatus and a method to smoothly communicate between the user and the apparatus by using the user's gaze object.

It is another object of the present invention to provide a multi-modal interface apparatus and a method for the user to effectively operate the apparatus by using the user's looks.

According to the present invention, there is provided a multi-modal interface apparatus, comprising: gaze object detection means for detecting a user's gaze object; media input means for inputting at least one medium of sound information, character information, image information and operation information from the user; personified image presentation means for presenting a personified image to the user based on the user's gaze object; and control means for controlling a reception of inputted media based on the user's gaze object.

Further in accordance with the present invention, there is also provided a multi-modal interface method, comprising the steps of: detecting a user's gaze object; inputting at least one medium of sound information, character information, image information and operation information from the user; presenting a personified image to the user based on the user's gaze object; and controlling a reception of inputted media based on the user's gaze object.

Further in accordance with the present invention, there is also provided a computer readable memory containing computer readable instructions, comprising: instruction means for causing a computer to detect a user's gaze object; instruction means for causing a computer to input at least one medium of sound information, character information, image information and operation information from the user; instruction means for causing a computer to present a personified image to the user based on the user's gaze object; and instruction means for causing a computer to control a reception of inputted media based on the user's gaze object.

Further in accordance with the present invention, there is also provided a multi-modal interface apparatus, comprising: image input means for inputting a user's image; recognition means for extracting a gesture input from the user's image, and for recognizing the gesture input as the user's action status information; control means for determining at least one of looks and action of a personified image based on the user's action status information, and for generating the personified image including the at least one of looks and action; and personified image presentation means for presenting the personified image to the user as a feedback information.

Further in accordance with the present invention, there is also provided a multi-modal interface method, comprising the steps of: inputting a user's image; extracting a gesture input from the user's image; recognizing the gesture input as the user's action status information; determining at least one of looks and action of a personified image based on the user's action status information; generating the personified image including the at least one of looks and action; and presenting the personified image to the user as a feedback information.

Further in accordance with the present invention, there is also provided a computer readable memory containing computer readable instructions, comprising: instruction means for causing a computer to input a user's image; instruction means for causing a computer to extract a gesture input from the user's image; instruction means for causing a computer to recognize the gesture input as the user's action status information; instruction means for causing a computer to determine at least one of looks and action of a personified image based on the user's action status information; instruction means for causing a computer to generate the personified image including the at least one of looks and action; and instruction means for causing a computer to present the personified image to the user as a feedback information.

Further in accordance with the present invention, there is also provided multi-modal interface apparatus, comprising: image input means for inputting a user's face image during the user's operation of predetermined object on a display; face image processing means for extracting a feature from the user's face image; recognition decision means for storing the feature of the user's face image as a dictionary pattern and the user's operation of predetermined object, as an event, and for recognizing a user's face image newly inputted through said image input means by referring to the dictionary pattern; and object control means for controlling the event of predetermined object on the display based on a recognition result of said recognition decision means.

Further in accordance with the present invention, there is also provided a multi-modal interface method, comprising the steps of: inputting a user's face image during the user's operation of predetermined object on a display; extracting a feature from the user's face image; storing the feature of the user's face image as a dictionary pattern and the user's operation of predetermined object as an event; recognizing a user's face image newly inputted by referring to the dictionary pattern; and controlling the event of predetermined object on the display based on a recognition result at recognizing step.

Further in accordance with the present invention, there is also provided a computer readable memory containing computer readable instructions, comprising: instruction means for causing a computer to input a user's face image during the user's operation of predetermined object on a display; instruction means for causing a computer to extract a feature from the user's face image; instruction means for causing a computer to store the feature of the user's face image as a dictionary pattern and the user's operation of predetermined object as an event; instruction means for causing a computer to recognize a user's face image newly inputted by referring to the dictionary pattern; and instruction means for causing a computer to control the event of predetermined object on the display based on a recognition result at recognizing step.

BRIEF DESCRIPTION OF THE DRAWINGS

FIG. 2 is a schematic diagram of the gaze object information outputted by a gaze object detection section according to the first embodiment of the present invention.

FIG. 7 is a schematic diagram of a control rule memory section 202 according to the first embodiment of the present invention.

FIG. 8 is a schematic diagram of a interpretation rule memory section 203 according to the first embodiment of the present invention.

FIG. 10 is a schematic diagram of internal status of the multi-modal interface apparatus at each timing according to the first embodiment of the present invention.

FIG. 15 is a schematic diagram of stored content of the location information memory section 1105 of the multi-modal interface apparatus in FIG. 13.

FIG. 21 is a schematic diagram of detection of the face image from the input image.

FIGS. 22A to 22E are schematic diagram of extraction of the feature points from the face image.

FIGS. 23A to 23D are schematic diagram representing relation between the face direction and the feature quantity of the face image.

FIGS. 32A to 32F are schematic diagram of input of the user's face image as the dictionary for each window according to the third embodiment of the present invention.

FIG. 33 is a schematic diagram of input of the user's face image as the dictionary for TV channel operation according to the third embodiment of the present invention.

DETAILED DESCRIPTION OF THE PREFERRED EMBODIMENTS

Figure 1:
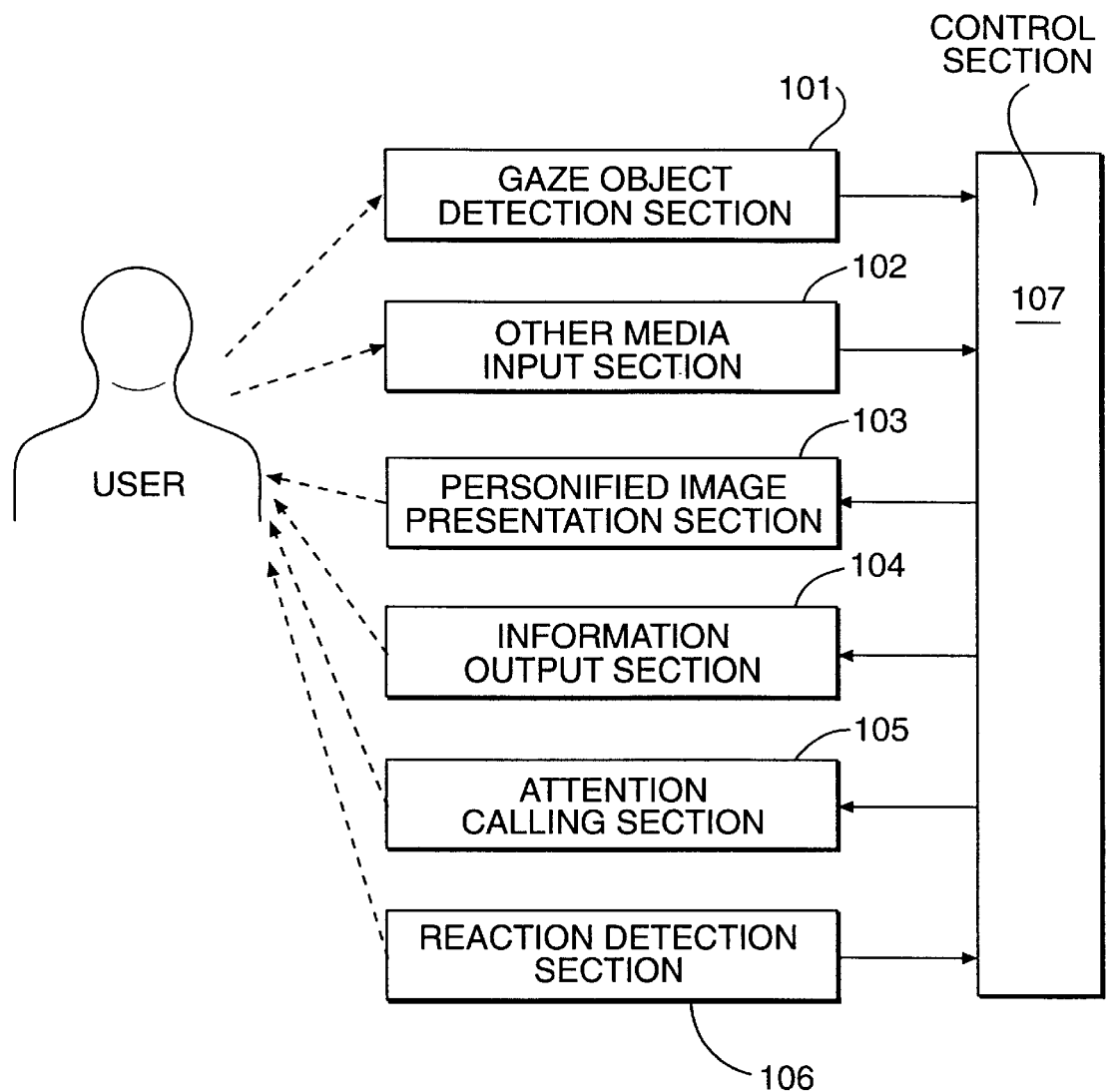
FIG. 1 is a block diagram of the multi-modal interface apparatus according to a first embodiment of the present invention.

FIG. 1 is a block diagram of the multi-modal interface apparatus according to the first embodiment of the present invention. The multi-modal interface apparatus is comprised of a gaze object detection section 101, an other media input section 102, a personified (human-like) image presentation section 103, an information output section 104, an attention calling section 105, a reaction detection section 106. The gaze object detection section 101 detects the user's facing "place, area, direction, object, its part" by using the user's visual line at each timing and outputs as the gaze object information. For example, the gaze object detection section 101 processes the user's face image inputted by an eye-tracker apparatus to observe the user's eye movement, a head-tracker apparatus to detect the user's head movement, a seated sensor, or a camera to observe the user, and detects the user's visual line (line of sight) to decide the user's gaze object. In this case, all or each part of objects to be gazed by the user are previously named. The gaze object detection section 101 outputs the gaze object name and its time at predetermined interval. FIG. 2 is a schematic diagram of the gaze object information outputted by the gaze object detection section 101. As shown in FIG. 2, the gaze object information is comprised of a gaze object ID, a gaze object name and a time. The gaze object ID is order number corresponding to the gaze object such as "P101, P102 . . . ". The gaze object name is name of detected gaze object such as "personified image, other person, output area, . . . ". The time is timing information which the gaze object is detected such as "t3, t10, t15, . . . ,". In short, whenever the object which the user is gazing is detected, ID is orderly assigned to the gaze object and outputted with the gaze object name and the time information. In FIG. 2, as for ID "P101", the gaze object is "personified image" and the time is "t3". As for ID "P102", the gaze object is "other person" and the time is "t10". As for ID "P106", the gaze object is "output area" and the time is "t22".

Figure 3:
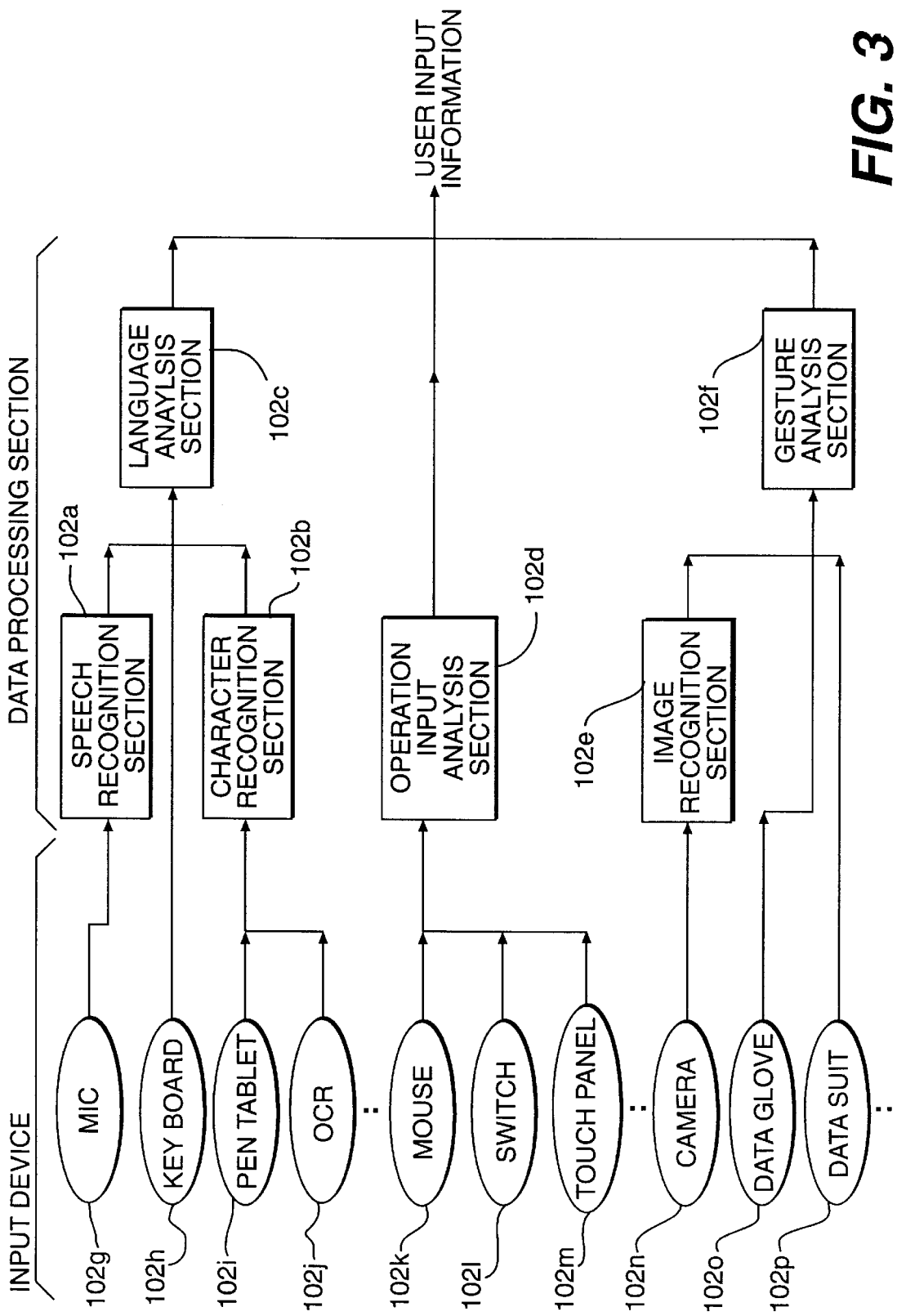
FIG. 3 is a block diagram of an other media input section 102 according to the first embodiment of the present invention.

The other media input section 102 inputs the user's information through various kinds of input device. FIG. 3 is a block diagram of the other media input section 102. As shown in FIG. 3, the other media input section 102 is divided into an input device and a data processing section. The data processing section is comprised of a speech recognition section 102a, a character recognition section 102b, a language analysis section 102c, an operation input analysis section 102d, an image recognition section 102e, and a gesture analysis section 102f. The input device is a mic 102g, a key board 102h, a pen tablet 102i, an OCR 102j, a mouse 102k, a switch 102l, a touch panel 102m, a camera 102n, a data glove 102o, and data suit 102p. The speech recognition section 102a analyzes speech signal outputted by the mic 102g and orderly outputs as word information. The character recognition section 102b recognizes character pattern outputted by the pen tablet 102i and OCR 102j, and orderly outputs as recognized character information. The language analysis section 102c decides the user's intention based on the character code information from the keyboard 102h and the character information from the speech recognition section 102a and the character recognition section 102b. The user's intention is outputted as a user input information. The operation input analysis section 102d analyzes the user's operation information through the mouse 102k, the switch 102l, the touch panel 102m, and outputs as the user input information. The image recognition section 102e recognizes the user's silhouette, visual line, face direction from the user's face image outputted by the camera 102n, and outputs as the user input information. The data glove 102o includes each kind of sensor at each part and outputs data of a finger curve and a finger movement when the user puts on the glove. The data suit 102p includes each kind of sensor and outputs movement of the user's body when the user wears the data suit. The gesture analysis section 102f analyzes the gesture as the user's movement based on the information outputted by the data glove 102o, the data suit 102p, the image recognition section 102e, and outputs the gesture information as the user input information. In short, as for the user's speech information, visual information, operation information outputted from at least one input device, the other media input section 102 executes at least one processing of fetching, sampling, coding, digitizing, filtering, signal conversion, recording, storing, pattern recognition, analysis of language/speech/image/movement/ operation, and outputs the user input information.

Figure 4:
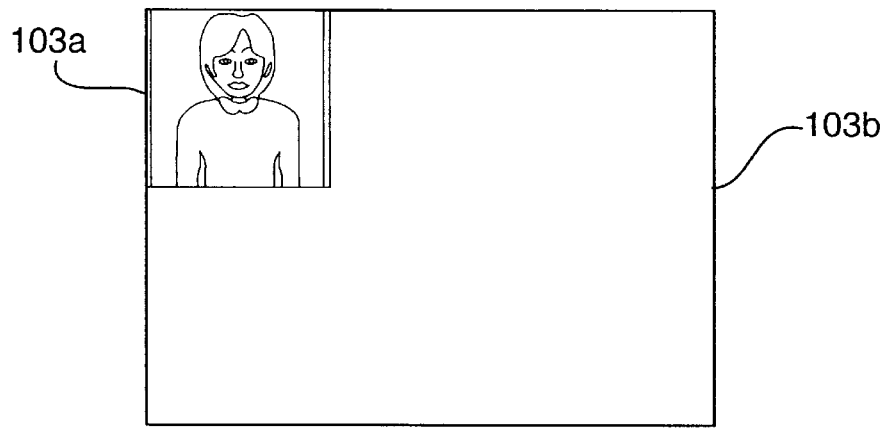
FIG. 4 is a schematic diagram of a display including an output of a personified image presentation section 103 according to the first embodiment of the present invention.

The personified image presentation section 103 presents the personified agent image whose gesture and looks changes by a situation of the user's gaze object. FIG. 4 is a schematic diagram of display screen including the personified agent image. In FIG. 4, first area 103a outputs the personified image and second area 103b outputs other information. In the interaction between the user and the multi-modal interface apparatus, the personified image can express the intention to be presented as the gesture and the looks. By controlling of the control section 107 (explained afterward), various intentions of the apparatus such as "affirmation", "calling", "the user's speech is catched", "communication is failed" are presented as the personified image. When the user watches the personified image on the display, he can intuitively recognize a present situation of the apparatus. In this case, in same way of dialogue between humans, degree of understanding and situation in the apparatus is presented as the personified image. Therefore, communication between the user and the apparatus is smoothly executed.

Figure 5:
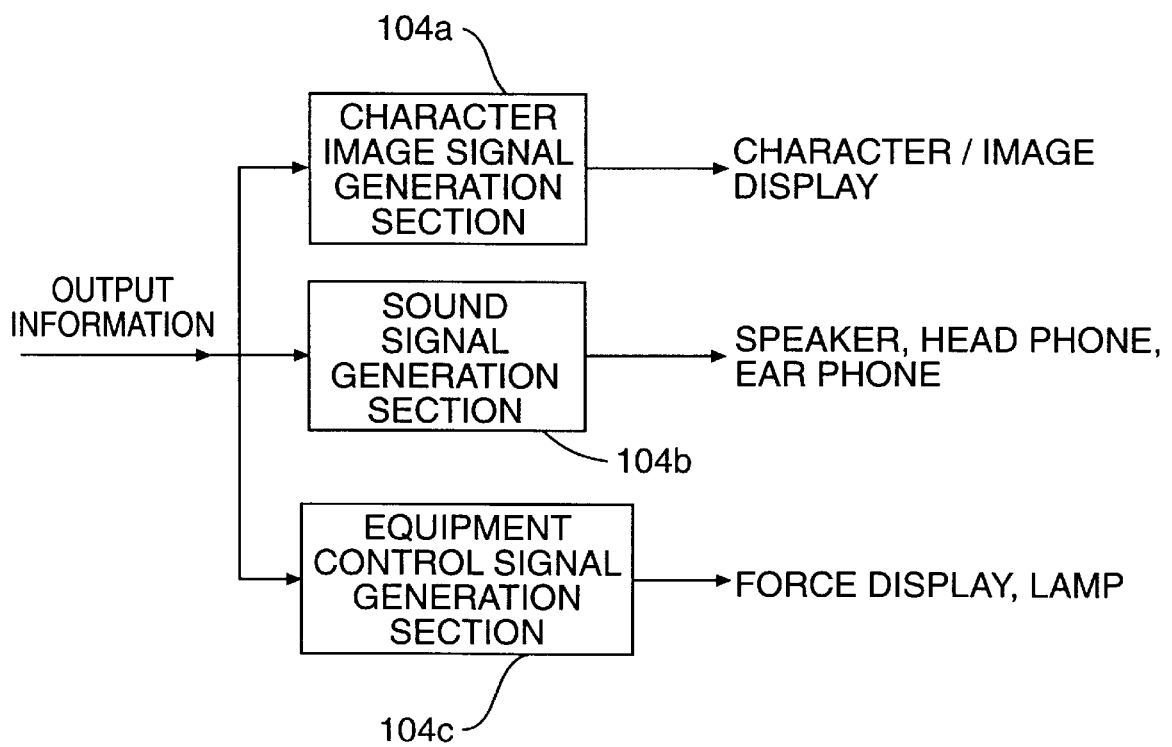
FIG. 5 is a block diagram of an information output section 104 according to the first embodiment of the present invention.

The information output section 104 outputs character, still image, dynamic image, speech, warning sound and force to the user. FIG. 5 is a block diagram of the information output section 104. As shown in FIG. 5, the information output section 104 is comprised of a character image signal generation section 104a, a sound signal generation section 104b and an equipment control signal generation section 104c. The character image signal generation section 104a generates the character image signal to be displayed according to information from the control section 107. The sound signal generation section 104b generates the sound signal to be outputted according to information from the control section 107 and outputs the sound signal through a speaker, a head phone, an ear phone. The equipment control signal generation section 104c generates control signal to output physical force or to display a lamp as reaction to the user according to the information from the control section 107. As the information to output to the user, the information output section 104 receives the information from a problem solution apparatus or a database apparatus (not shown in Fig.) as element of the multi-modal interface apparatus, and presents the character/still image/dynamic image/speech/warning sound/force to the user through various kinds of output device.

The attention calling section 105 in FIG. 1 generates calling or warning sound to the user to call the user's attention. By controlling of the control section 107, the attention calling section 105 output the user's name or calling word as the sound signal or character signal, displays repeatedly as flash screen, outputs light signal through the lamp, presents the physical force signal through the force display. Alternatively, the attention calling section 105 outputs the personified image to call the user's attention through the personified image presentation section 103. The attention calling section 105 may be composed as one element or included as a function in the information output section 104.

The reaction detection section 106 in FIG. 1 detects the user's reaction for the action outputted from the multi-modal interface apparatus. When the attention calling section 105 presents the attention calling to the user, the reaction detection section 106 detects the user's predetermined operation, predetermined speech, predetermined gesture through various kinds of the input device. Alternatively, the reaction detection section 106 decides the user's reaction by referring to the user's gaze object obtained by the gaze object detection section 101, and outputs as the user reaction information. The reaction detection section 106 may be composed as one element or included as a function in other media input section 102.

Figure 6:
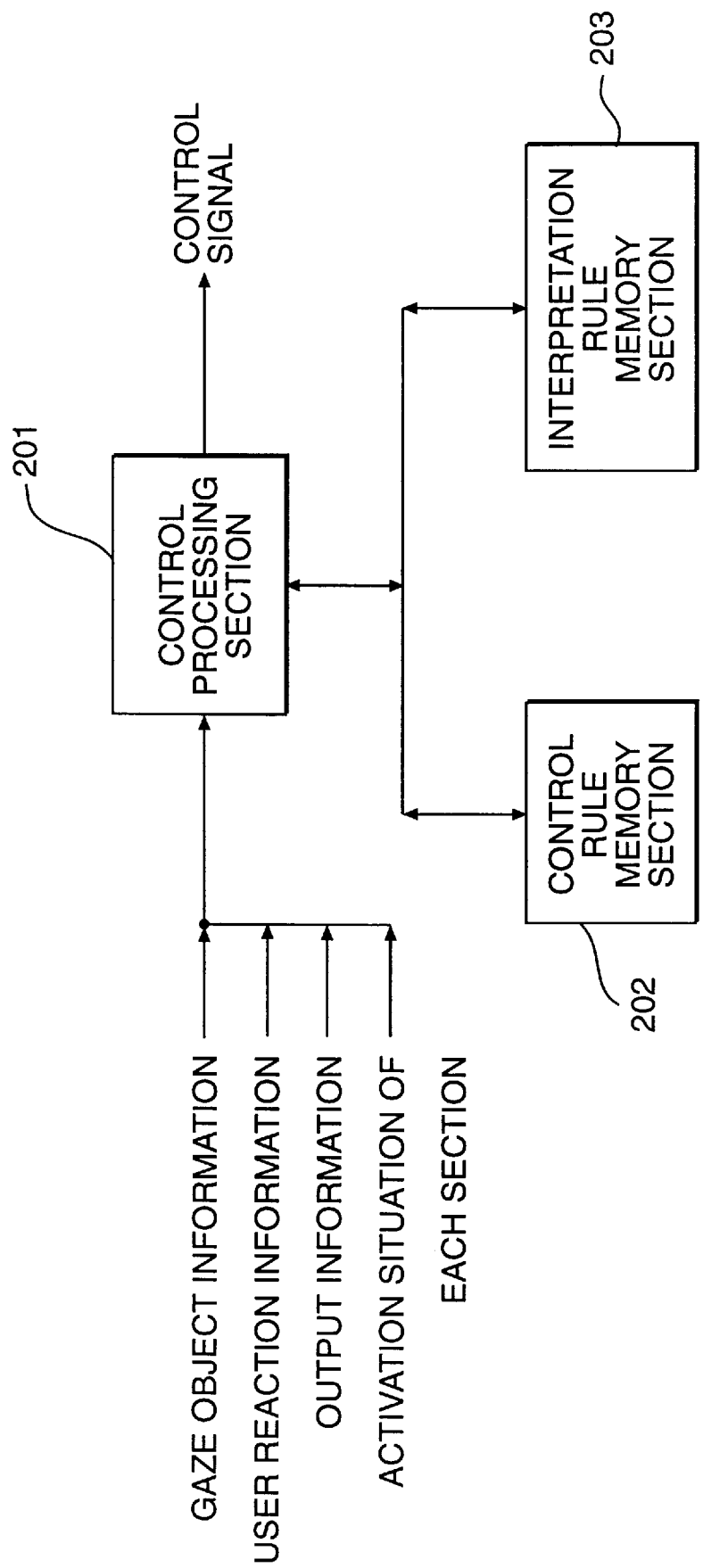
FIG. 6 is a block diagram of a control section 107 according to the first embodiment of the present invention.

The control section 107 in FIG. 1 executes controlling of each processing, calculation, decision, which is a central section of the multi-modal interface apparatus. FIG. 6 is a block diagram of the control section 107. As shown in FIG. 6, the control section 107 is comprised of a control processing section 201, a control rule memory section 202 and an interpretation rule memory section 203. The control processing section 201 includes a status register S to store the status information of each element and an information kind register M to store the kind of input/output information. The control processing section 201 receives signals such as activation situation of each section, the gaze object information, the user reaction information, the output information, and executes the processing method A (explained afterwards) according to the received signal, content of the status register S, the control rule memory section 202 and the interpretation rule memory section 203. The control processing section 201 outputs control signal to each section according to the processing result. The control rule memory section 202 previously stores each control rule and the interpretation rule memory section 203 previously stores each interpretation rule. FIG. 7 is a schematic diagram of the control rule in the control rule memory section 202. Each rule is consisted of "rule ID", "present status information", "event condition information", "action information", "next status information". The rule ID is an identifier of the control rule. The present status information is content of the status register S to apply the control rule. The event condition information is a limit as a condition to apply the control rule. The action information is a processing list to be executed if the control rule is applied. The next status information is update value to store the status register S. Concretely speaking, as for the rule ID, the identifier of the control rule is recorded as "Q1", "Q2", "Q3", "Q4", "Q5" . . . . As for the present status information, the content of the status register S as a condition to apply the control rule is recorded as "INPUT/OUTPUT WAITING", "ON INPUT", "ON CONFIRMATION", "ON OUTPUT", "ON INTERRUPTION", "ON CALLING". As for the event condition information, the event of the condition is recorded as "INPUT REQUEST", "OUTPUT CONTROL RECEIVING", "OUTPUT START REQUEST", "OUTPUT PREPARATION REQUEST", "INPUT COMPLETION". The action information is the processing to be executed as "INPUT RECEIPT FB/INPUT RECEIPT START", "OUTPUT START", "OUTPUT OR NOT", "INPUT RECEIPT STOP/INPUT COMPLETION FB", "OUTPUT START", "CALL". In this case, "INPUT RECEIPT FB" represents a feedback (FB) that input from the other media input section 102 is possible. For example, character, image, or sound of affirmation is outputted. The personified agent image gazes the user or acts a gesture to be hard of hearing. "INPUT COMPLETION FB" represents that communication to the user is correctly executed. "CONFIRMATION RECEIPT FB" represents that confirmation intention from the user for calling is correctly received. "INPUT RECEIPT FB" represents a processing to present character, image, sound signal or a nod gesture of the personified agent image. "CANCEL FB" represents a processing to present that some problem occurs in communication to the user. For example, warning sound, character or image of warning are outputted. The personified agent image acts a gesture to bend both arms while the palm of the hand is positioned to an upper side. "INPUT RECEIPT START" and "INPUT RECEIPT STOP" respectively represent a start processing and a stop processing of input of the other media input section 102. "OUTPUT START", "OUTPUT INTERRUPTION", "OUTPUT RESTART", "OUTPUT STOP" respectively represents a start processing, an interruption processing, a restart processing, a stop processing of output from the information output section 104 to the user. "OUTPUT OR NOT" represents a processing to decide whether information is possible to present to the user by referring to the gaze object information and content of the interpretation rule memory section 203. "CALL" represents a processing to call the user's attention when the information is presented to the user. For example, a warning sound, a call sound or the user's name is presented. The screen of the display is controlled as flash (repeat invert display). The personified agent image acts a gesture to wave the hard as right and left. The next status information is record information of the status register S as update value such as "ON INPUT", "ON CONFIRMATION", "ON OUTPUT", "ON PREPARATION", "INPUT/OUTPUT WAITING", "ON CALLING". As for the rule ID "Q1", if content of the status register S is "INPUT/OUTPUT WAITING", "INPUT REQUEST" as event is occurred. In this case, "INPUT RECEIPT FB" and "INPUT RECEIPT START" are executed as control processing and "ON INPUT" is written in the status register S as update value. In short, the content of the status register S is updated from "INPUT/OUTPUT WAITING" to "ON INPUT" if the control rule "Q1" is executed. In same way, as for the rule ID "Q5", if content of the status register S is "ON INPUT", "INPUT COMPLETION" as event is occurred. In this case, "INPUT RECEIPUT STOP" and "INPUT COMPLETION FB" are executed as control processing and "INPUT/OUTPUT WAITING" is written in the status register S as update value.

FIG. 8 is a schematic diagram of content of the interpretation rule memory section 203. Each rule is comprised of "rule ID", "present status information", "gaze object information", "kind of input/output information", "interpretation result information". The rule ID is an identifier of the interpretation rule. The present status information is content of the status register S to apply the interpretation rule. The gaze object information is predetermined gaze object name to compare with the gaze object outputted by the gaze object detection section 101. The kind input/output information is a limit of input information in case of the user's input and a limit of presentation information in case of output to the user. The interpretation result information is an application result of the interpretation rule to the gaze object information received from the gaze object detection section 101. Concretely speaking, as for the rule ID, the identifier of the interpretation rule is recorded as "R1", "R2", "R3", "R4", "R5", "R6". As for the present status information, the content of the status register S to apply the interpretation rule is recorded as "INPUT/OUTPUT WAITING", "ON INPUT", "ON CONFIRMATION", "ON OUTPUT", "ON PREPARATION", "ON INTERRUPTION". As for the gaze object information, the predetermined gaze object name to compare with the received gaze object information is recorded as "INPUT REQUEST AREA", "PERSONIFIED IMAGE", "MIC AREA", "CAMERA AREA", "OUTPUT REQUEST AREA", "CANCEL REQUEST AREA", "OTHER PERSON", "OUTPUT AREA". As for the kind of input/output information, a limit for kind of input information is recorded in case of the user's input and a limit for kind of output information is recorded in case of output to the user, such as "SOUND INFORMATION", "VISUAL INFORMATION", "DYNAMIC IMAGE INFORMATION", "STILL IMAGE INFORMATION". As for the interpretation result information, interpretation result to apply the interpretation rule to the received gaze object is recorded as "INPUT REQUEST", "OUTPUT PREPARATION", "OUTPUT REQUEST", "CANCEL REQUEST", "OUTPUT POSSIBLE", "INTERRUPTION REQUEST". Therefore, as for the rule ID "R2", if the content of the status register S is "INPUT/OUTPUT WAITING", the gaze object received from the gaze object detection section 101 is "PERSONIFIED IMAGE" and the content of the information kind register M is "SOUND INFORMATION", interpretation result of this situation is decided as "INPUT REQUEST".

Figure 9:
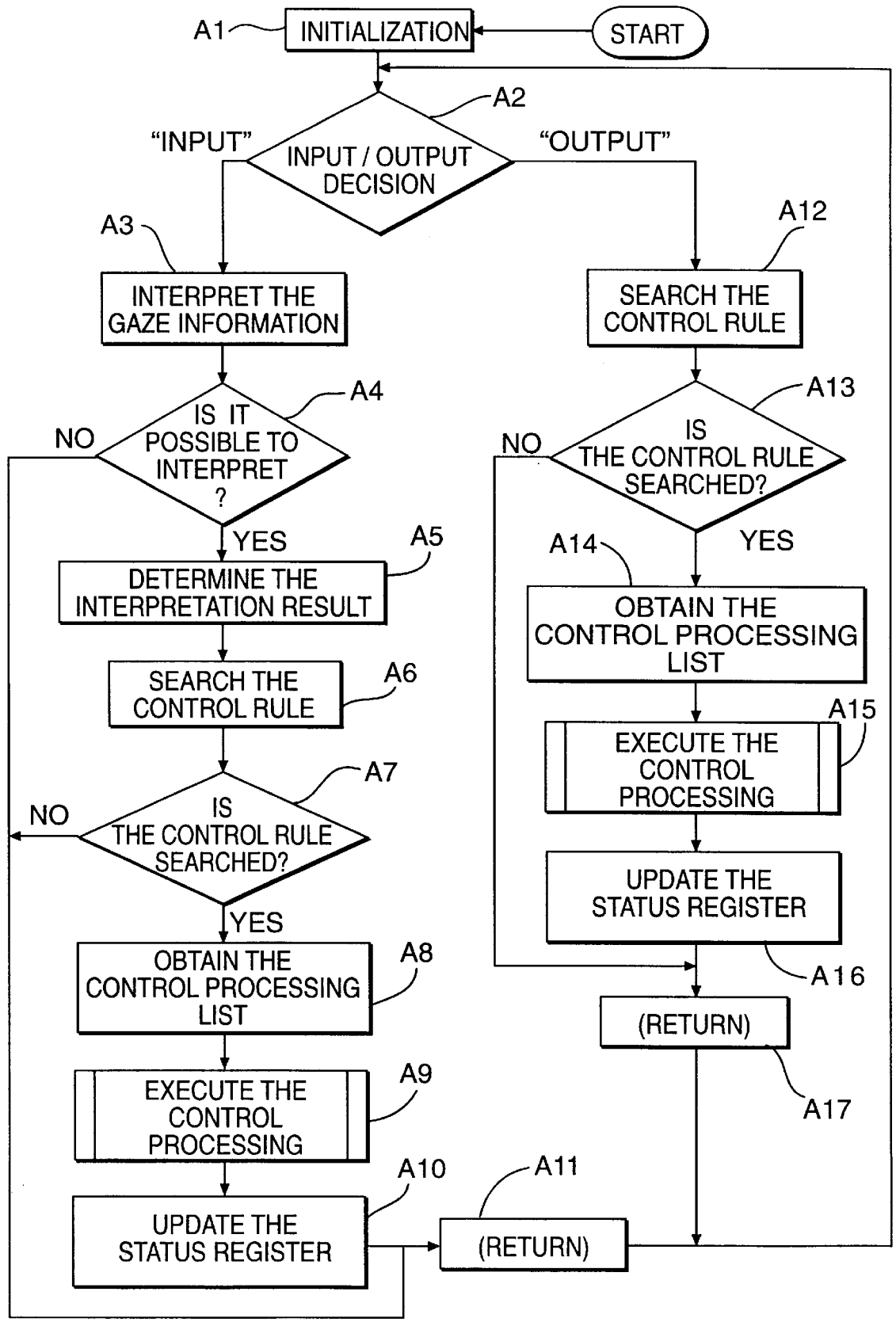
FIG. 9 is a flow chart of processing of a multi-modal interface method according to the first embodiment of the present invention.

Next, a processing of the control processing section 201 is explained in detail. FIG. 9 is a flow chart of the processing method A of the control processing section 201.

(STEP A1) First, the control processing section 201 is initialized. In this case, the status register S and the information kind register M are initialized. The status register S is set as "INPUT/OUTPUT WAITING". The information kind register M is set as "UNDEFINED". In short, the other media input section 102 is under a status of reception of input.

(STEP A2) After initialization, decision of input/output signal is executed. If the gaze object information Gi is inputted from the gaze object detection section 101 to the control section 107, the processing is forwarded to step A3. If the output information Oj is supplied from the problem solution apparatus or the database apparatus (not shown in Fig.) to the control section 107, the processing is forwarded to step A12. The output information Oj is control signal to present information to the user, which includes the information content Cj to be presented and the information kind Mj.

(STEP A3) This processing is decision of the received gaze object. Each content of the status register S, the gaze object information Gi and the information kind register M is respectively compared with content of the present status information, the gaze object information and the kind of input/output information in the interpretation rule memory section 203. In this way, the interpretation rule Ri (i=1~) which above condition is satisfied is searched.

(STEP A4) At step A3, if the interpretation rule Ri is not searched, the processing is forwarded to step A11. If the interpretation rule Ri is searched, the processing is forwarded to step A5.

(STEP A5) The interpretation result information Ri corresponding to the interpretation rule Ri is retrieved. The processing is forwarded to step A6.

(STEP A6) Each content of the status register S and the interpretation result information Ri is respectively compared with content of the present status information and the event condition information in the control rule memory section 202. In this way, the control rule Qi (i=1~) which above condition is satisfied is searched.

(STEP A7) At step A6, if the control rule Qi is not searched, the processing is forwarded to step A11. If the control rule Qi is searched, the processing is forwarded to step A3.

(STEP A8) The action information [Ci1, Ci2, . . . ] corresponding to the control rule Qi is retrieved. The processing is forwarded to step A9.

(STEP A9) As for the action information [Ci1, Ci2, . . . ], each control processing is executed by the processing method B(explained afterward) of the processing list [Ci1, Ci2, . . . ].

(STEP A10) The next status information of the control rule Qi is written in the status register S as update value. The processing is forwarded to step A11.

(STEP A11) Processing of the gaze object information Gi is completed. The processing is returned to step A2.

(STEP A12) If the output information Oj is decided to be supplied at step A2, the information kind Mj of the output information Oj is written in the information kind register M. The control rule Qk (k=1~), which the present status information is matched with content of the status register S and the event condition information is "OUTPUT CONTROL RECEIVING", is searched from the control rule memory section 202. The processing is forwarded to step A13.

(STEP A13) If the control rule Qk which above condition is satisfied is not searched, at step A12, the processing is forwarded to step A17. If the control rule Qk is searched, the processing is forwarded to step A14.

(STEP A14) The action information [Ck1, Ck2, . . . ] corresponding to the control rule Qk is retrieved as control processing list to be executed.

(STEP A15) As for the action information [Ck1, Ck2, . . . ], each control processing is executed by the processing method B (explained afterward) of the processing list [Ck1, Ck2, . . . ].

(STEP A16) The next status information of the control rule Qk is written in the status register S as update value.

(STEP A17) Processing of the output information Oj is completed. The processing is returned to step A2.

As mentioned-above, the input information to the control processing section 201 is decided to be the user's input information or the output information to the user. If it is the user's input information, the user's gaze object is interpreted and the control rule corresponding to the interpretation result is searched by referring to the status register S and the information kind register M. The action information is retrieved from the searched control rule and executed as control processing. If it is the output information to the user, the control rule is searched by referring to the status register S. The action information is retrieved from the searched control rule and executed as control processing. In short, in order to smoothly communicate between the user and the apparatus by using various kinds of input/output device, the control processing to be executed along flow of communication is predetermined by the control rule. Therefore, noise element in sound recognition is excluded and error operation is protected. Furthermore, in accordance with the user's situation, the apparatus outputs calling for the user's attention and displays the identified agent image whose gesture is changed by the user's gaze object and reaction.

Next, the processing method B corresponding to each action information in the control memory section 202 is explained in detail.

[STEP B1] The action information is "INPUT RECEIPT FB". In this case, the characters "INPUT POSSIBLE", the still image of a picture in which a circle is drawn at the mic, synthetic voice of "YES", or a chime sound are presented to the user. Alternatively, the personified agent image is displayed as the gesture to gaze to the user or be hard of hearing.

[STEP B2] The action information is "INPUT COMPLETION FB". In this case, the characters "INPUT COMPLETION", the still image of a picture in which "X" is marked at the mic, the synthetic voice of "YES", or the chime sound are presented to the user. Alternatively, the personified agent image is displayed as the gesture to gaze to the user or nod.

[STEP B3] The action information is "CONFIRMATION RECEIPT FB". In this case, the characters "CONFIRMATION", the synthetic voice of "YES", or the chime sound are presented to the user. Alternatively, the personified agent image is displayed as the gesture to gaze to the user or nod.

[STEP B4] The action information is "CANCEL FB". In this case, the characters of warning or the warning sound is outputted. Alternatively, the personified agent image is displayed as the gesture to bend both hands while the palm of the hand is positioned to upper side.

[STEP B5] The action information is "INPUT RECEIPT START" or "INPUT RECEIPT STOP". In these cases, input from the other media input section 102 is respectively started or stopped.

[STEP B6] The action information is "OUTPUT START", "OUTPUT INTERRUPTION", "OUTPUT RESTART", "OUTPUT STOP". In these cases, output from the information output section 104 to the user is respectively started, interrupted, restarted, stopped.

[STEP B8] The action information is "CALL". In this case, the warning sound, the synthetic voice of "EXCUSE ME", the user's name are presented. The display may be controlled as flash (repeatedly invert display). Alternatively, the personified agent image is displayed as the gesture to wave the hand right and left.

Next, concrete example of the processing of the multi-modal interface apparatus is explained. In the multi-modal interface apparatus of this case, assume that the gaze object detection section 101 includes a detection function of the user's visual line and head direction, the other media input section 102 includes a sound input function, the personified image presentation section 103 includes a function to present the personified image whose gesture and looks change, the information output section 104 includes a function to output the character information, the image information, the sound information. FIG. 10 is a schematic diagram of internal status of the multi-modal interface apparatus at each timing.

[t0] By processing the step A1 of above mentioned method A, "INPUT/OUTPUT WAITING" is recorded in the status register S and "UNDEFINED" is recorded in the information kind register M. In this case, the other media input section 102 is under a status to be not received the sound.

[t1] Assume that noise is generated around the multi-modal interface apparatus. However, this noise is not inputted because of the status to be not received the sound. Therefore, error operation is not occurred.

Figure 11A:
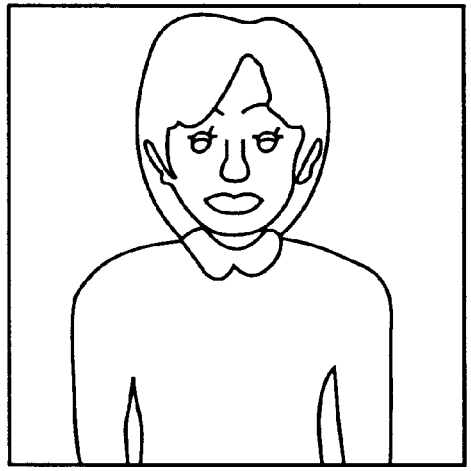
FIGS. 11A to 11B are schematic diagrams of a personified agent image outputted by the personified image presentation section 103 according to the first embodiment of the present invention.

[t2] Assume that the user gazes the personified agent image to input speech. In this case, as shown in FIG. 4, the personified image display area 103a outputs a receptionist to communicate to the user and the information output area 103b outputs the character and the image information. In the personified image display area 103a, the upper half of the body of the receptionist is presented at initialization mode as shown in FIG. 11A. Therefore, the user unconsciously gazes the receptionist image.

[t3] The gaze object detection section 101 detects the user's gaze object (the receptionist image) and outputs as the gaze object information as shown in FIG. 2 (ID=P101).

[t4] The interpretation rule corresponding to the gaze object information is retrieved from the interpretation rule memory section 203. In this case, the content of the status register S is "INPUT/OUTPUT WAITING" and the gaze object information is "PERSONIFIED IMAGE" (P101 in FIG. 2). Therefore, the interpretation rule "R2" in FIG. 8 is retrieved.

[t5] The interpretation result information "INPUT REQUEST" of the interpretation rule R2 is obtained.

[t6] The control rule is retrieved from the control rule memory section 202. In this case, the content of the status register S is "INPUT/OUTPUT WAITING" and the event condition information (the interpretation result) is "INPUT REQUEST". Therefore, the control rule "Q1" in FIG. 7 is retrieved. The action information "INPUT RECEIPT FB/INPUT RECEIPT START" of the control rule Q1 is obtained.

Figure 11B:
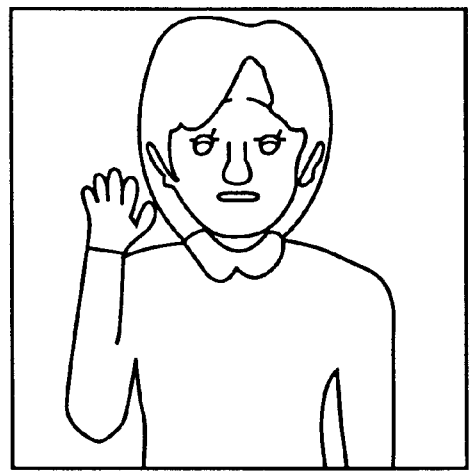

[t7] Based on [STEP B1] corresponding to the action information "INPUT RECEIPT FB", the personified image of the gesture to be hard of the hearing is displayed as shown in FIG. 11B and the synthetic voice "YES" is outputted to the user. The reception of speech input starts. The status register S is updated by the next status information "ON INPUT" of the control rule Q2.

[t8] When the speech input from the user is completed, control signal (event condition information) "INPUT COMPLETION" is outputted to the control section. In same way of [t6], the control rule Q5 is retrieved. In this case, the other media input section 102 is under a status that the sound is not received. Based on [STEP B2] corresponding to the action information of the control rule Q5, the characters "INPUT COMPLETION", the still image of a picture in which "X" is marked of the mic, or the chime sound is presented to the user.

In short, in a situation that the sound input is not necessary, the other media input section 102 is under a status that the sound input is not received. Therefore, error operation by the noise is prevented. In a situation that the sound input is necessary, if the user gazes the personified image, the other media input section 102 is under a status that the sound input is received. In this case, the sound input status of the other media input section 102 is informed to the user by a special gesture of the personified image. Therefore, the user can understand the sound input status of the other media input section.

[t9] Assume that other person X comes near the user and the user looks the other person X.

[t10] The gaze object detection section 101 detects the other person X and outputs "OTHER PERSON" (P102 in FIG. 2) as the gaze object information.

[t11] Processing same as [t4] is executed. However, in this case, the interpretation rule to match with this situation is not existed in the interpretation rule memory section 203. Therefore, this processing of the gaze object "OTHER PERSON" is completed.

[t12] While the user is looking at the other person X, the control signal to output the dynamic image to the user is supplied to the control section 107.

[t13] At the step A12 in FIG. 9, the dynamic image is recorded in the information kind register M. The control rule, which the present status information is matched with "INPUT/OUTPUT WAITING" of the status register S and the event condition information is "OUTPUT CONTROL RECEIVING", is searched from the control rule memory section 202. In FIG. 7, the control rule Q2 is retrieved.

[t14] As shown in FIG. 7, the control rule Q2 does not include the action information. At the step A16 in FIG. 7, the next status information "ON CONFIRMATION" of the control rule Q2 is recorded in the status register S as update value.

[t15] While the user is continuously looking at the other person X, the gaze object detection section 101 outputs the gaze object information "P103" of FIG. 2.

[t16] At the steps A2~A5 in FIG. 9, the interpretation rule, which the present status information is "ON CONFIRMATION", the gaze object information is "OTHER PERSON" and the kind of input/output information is "DYNAMIC IMAGE", is searched from the interpretation rule memory 203. In FIG. 8, the interpretation rule "R11" is retrieved. As the interpretation result of the interpretation rule R11, "OUTPUT IMPOSSIBLE" is obtained.

[t17] In same way of the processing [t6]~[t8], the control rule "Q9" is retrieved from the control rule memory section 202. By processing of [STEP B8], the display flash or the calling of the user's name is presented to the user.

[t18] Assume that the user turns to the output area of the display. The gaze object detection section 101 outputs the gaze object information "P104" of FIG. 2. In same way of above processing, the interpretation rule "R22" is retrieved from the interpretation rule memory section 203 in FIG. 8 and the interpretation result "CONFIRMATION DETECTION" is obtained. Therefore, the control rule "Q14" is retrieved from the control rule memory section 202 in FIG. 7 and the action information "CONFIRMATION RECEIPT FB/OUTPUT START" is obtained.

[t19] Based on the method [STEP B3], the character or the synthetic voice of "YES" is outputted. Then, based on the method [STEP B7], the dynamic image begins to be presented to the user. The content of the status register S is updated by the next status information "ON OUTPUT" of the control rule Q14.

[t20] Assume that the user gazes the other person X again. The gaze object detection section 101 outputs the gaze object information "P105" of FIG. 2.

[t21] In same way of above processing, the interpretation rule "R14" is retrieved from the interpretation rule memory section 203 in FIG. 8 and the interpretation result "INTERRUPTION REQUEST" is obtained. Therefore, the control rule "Q11" is retrieved from the control rule memory section 202 in FIG. 7 and the action information "OUTPUT INTERRUPTION" is obtained. As a result, the output from the information output section 104 is interrupted and the status register S is updated by "ON INTERRUPTION" of the control rule Q11.

[t22a] If the user gazes the output area again, the gaze object information "P106" is outputted. The interpretation rule "R19" and the control rule "Q12" are retrieved. Therefore, the output from the information output section 104 is restarted.

[t22b] If the user continuously gaze the other person X, control signal of interruption-time out is outputted because of passing a predetermined time. The control rule "Q13" is retrieved. In this case, the interruption of output of the dynamic image is informed to the user.

As mentioned-above, in the first embodiment, the presentation of the information is controlled by the user's gaze object, activation status of the apparatus and the kind of the information to be presented. Therefore, a first problem that the user can not correctly receive the presented information while he is not paying attention to the presented information is avoided. Furthermore, a second problem that he must indicate a special operation to interrupt or restart the output of the information and his load increases is also avoided.

Figure 12:
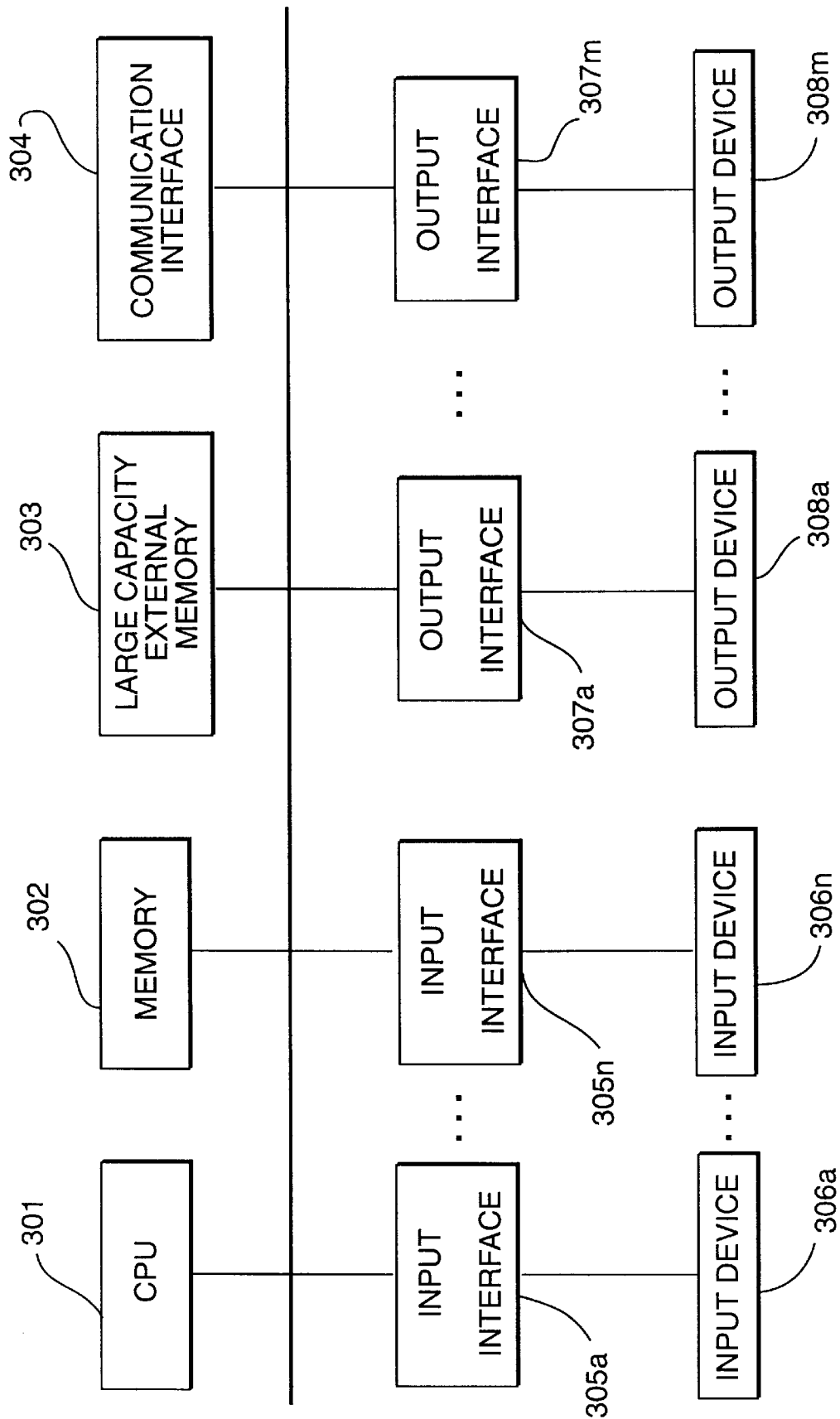
FIG. 12 is a block diagram of a general purpose computer to realize the multi-modal interface method according to the first embodiment of the present invention.

The present invention can be realized by a general computer to store the program of the multi-media interface method. In this case, as shown in FIG. 12, the general computer includes a CPU 301, a memory 302, a large capacity external memory 303, a communication interface 304. Input interface 305a~305n, input devices 306a~306n, output interface 307a~307n, output devices 308a~308m, are equipped to the general computer. As for the input devices 306a~306n, a mic, a keyboard, a pen tablet, an OCR, a mouse, a switch, a touch panel, a camera, a data glove, a data suit, are used. As for the output devices 308a~308m, a display, a speaker, a force display, are used. The processing of the present invention is executed by software processing of the CPU 30. The program to load to the CPU is stored in a magnetic disk (Floppy Disk, Hard Disk), an optical disk (CD-ROM, DVD), a semiconductor disk, which are distributed. Therefore, if the program as this recording media is read by the computer and executed by the CPU 301, function of the multi-modal interface apparatus of the present invention can be realized.

Figure 13:
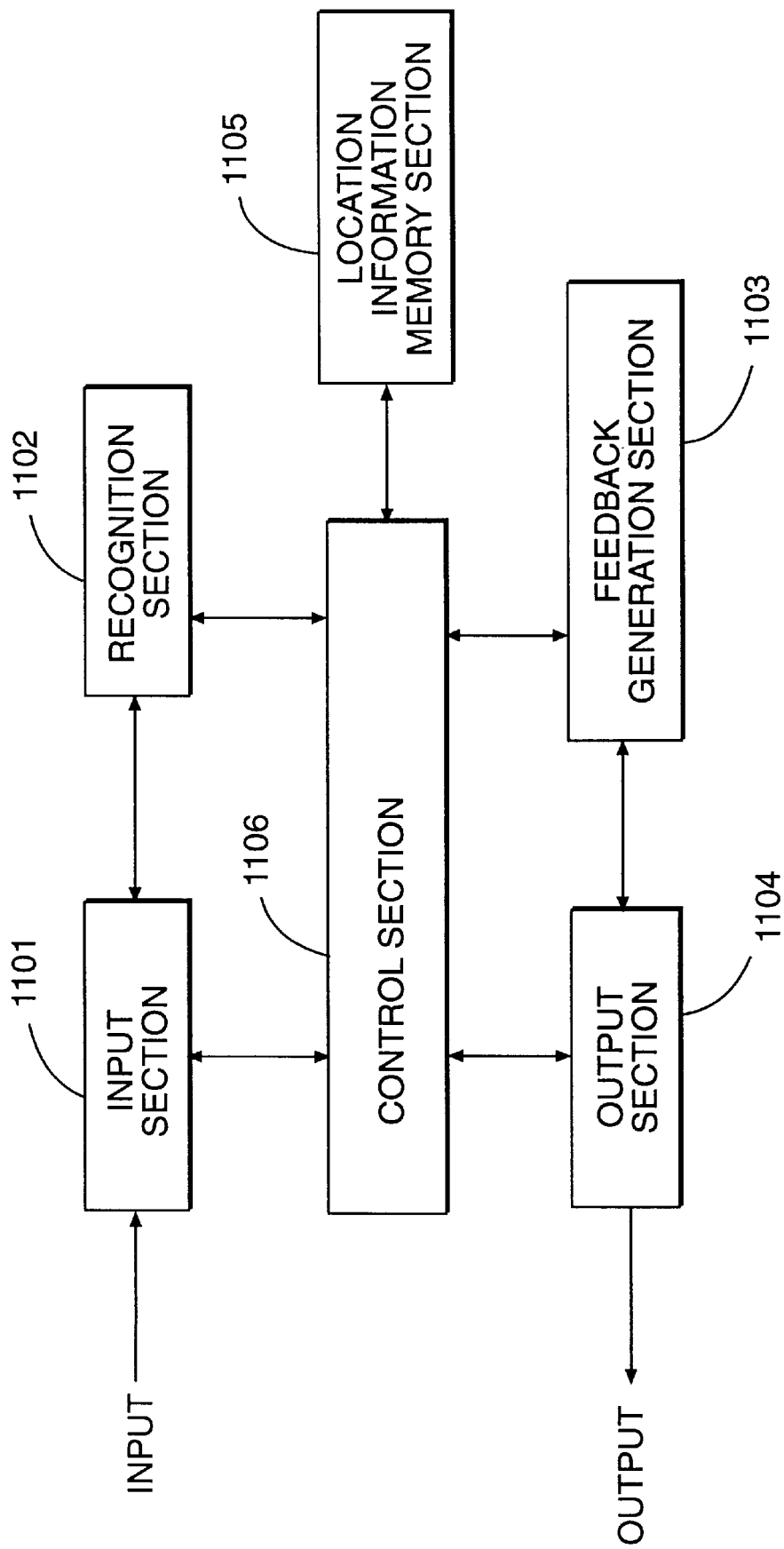
FIG. 13 is a block diagram of the multi-modal interface apparatus according to the second embodiment of the present invention.

FIG. 13 is a block diagram of the multi-modal interface apparatus according to the second embodiment of the present invention. As shown in FIG. 13, the multi-modal interface apparatus is comprised of an input section 1101, a recognition section 1102, a feedback generation section 1103, an output section 1104, a location information memory section 1105, a control section 1106. The input section 1101 inputs sound signal, image signal or operation signal from the user of the multi-modal interface apparatus. For example, a microphone to input the sound signal, a camera to input an image of the user's action and looks, an eye-tracker to detect a movement of the user's eye, a head-tracker to detect a movement of the user's head, a moving sensor to detect a movement of the user's body, a body (human) sensor to detect the user's approach, removal, seating, are used. In case of the sound input, the input section 1101 is comprised of the microphone, an amplifier and A/D conversion apparatus. In case of the image input, the input section 1101 is comprised of the camera, CCD element, the amplifier, the A/D conversion apparatus and the image memory apparatus. The recognition section 1102 analyzes the signals inputted by the input section 1101. For example, a time interval or space interval of the input signal is extracted and compared with a standard pattern to output a recognition result. Concretely speaking, in case of the sound input, the recognition section 1102 detects the sound interval by calculating a sound power per predetermined time, analyzes the frequency of the sound interval by FFT (Fast Fourier Transform), compares the frequency with the standard pattern of the sound dictionary by using DP(Dynamic Programing) and outputs the recognition result. In case of the image input, the user's hand area is extracted and the shape, the position, the detection, the movement of the hand area is recognized by using a method disclosed in "Uncalibrated Stereo Vision With Pointing for a Man-Machine Interface (R.Cipolla, et. al., Proceedings of MVA' 94, IAPR Workshop on Machine Vision Application, pp. 163–166, 1994)".

Figure 14:
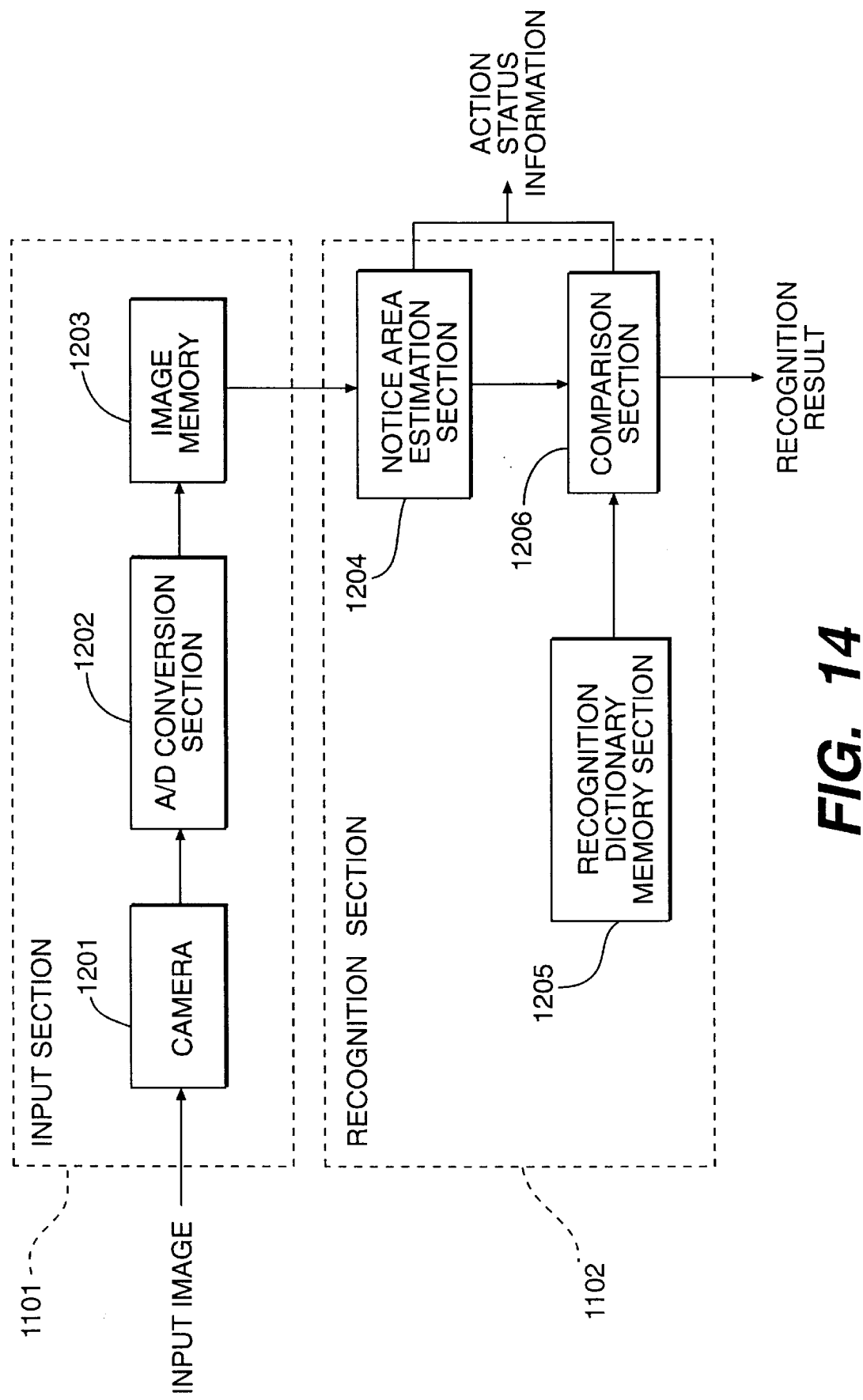
FIG. 14 is a block diagram of the input section and the recognition section of the multi-modal interface apparatus in FIG. 13.

FIG. 14 is a block diagram of the input section 1101 and the recognition section 1102 in case of the image input. As shown in FIG. 14, the input section 1101 is comprised of a camera 1201, A/D conversion section 1202, an image memory 1203. The camera 1201 inputs an image of the user's body, face or hand and outputs the image signal by CCD element. The A/D conversion section 1202 converts the image signal to digital image signal such as bit map. The image memory 1203 stores the digital image signal. The recognition section 1102 is comprised of a notice area estimation section 1204, a recognition dictionary memory section 1205, a comparison section 1206. The notice area estimation section 1204 extracts a notice area of the gesture input such as the user's face, hand, arm by referring to the content of the image memory 1203. The recognition dictionary memory section 1205 previously stores the representative image or the feature information of recognition object as the standard pattern. The comparison section 1206 compatres the notice area with the standard pattern by using pattern matching, DP, HMM(Hidden Markov Model) and outputs the recognition result. Action status of the notice area estimation section 1204 and the comparison section 1206 is outputted to the control section 1106. Processing of the notice area estimation section 1204 and the comparison section 1206 are collectively executed as one module.

In FIG. 13, the feedback generation section 1103 generates the information to be presented to the user. For example, attention calling to the user or warning sound to inform the action status is generated. The characters or images to be presented may be selected or dynamically generated. Sound wave signal may be generated from the characters to be presented by speech synthesis technique. A personified agent image such as "human", "animal", or "robot" who faces the user may be generated by CG(Computer Graphics). The personified agent image supplies a service to the user as the looks and the gesture of the still image or the dynamic image. The output section 1104 is comprised of at least one of a lamp, a CRT display, a LCD(liquid) display, a speaker, an amplifier, HMD(head mount display), a grasping power display, a head phone. The output section 1104 outputs the feedback information generated by the feedback generation section 1103. For example, in case of generating the sound signal from the feedback generation section 1103, the output section 1104 is the speaker to output the sound signal. In case of generating the personified agent image generated by the feedback generation section 1103, the output section 1104 is CRT display to output the personified agent image.

The location information memory section 1105 obtains the position information of the object pointed by the gesture input, the user's face or hand moved by the gesture input through the control section 1106 and orderly stores the position information. The location information memory section 1105 previously stores the space position of the input section 1101, the output section 1104 and the user as the location information. The position information and the location information are refferred by the feedback generation section 1103 in case of generating the personified agent image. FIG. 15 shows one example of content stored in the location information memory section 1105. As shown in FIG. 15, information of the object or the place pointed by the gesture input, the user's face and finger, and presentation place (output section) are orderly stored by classifying into "label information A", "representative position information B", "direction information C". In this case, the "label information A" represents the label to identify the object or the place whose position information and direction information are recorded. The "representative position information B" represents coordinate value of the object or the place based on the world coordinate axis. The "direction information C" represents a direction vector value of the object or the place based on the world coordinate axis.

Figure 16:
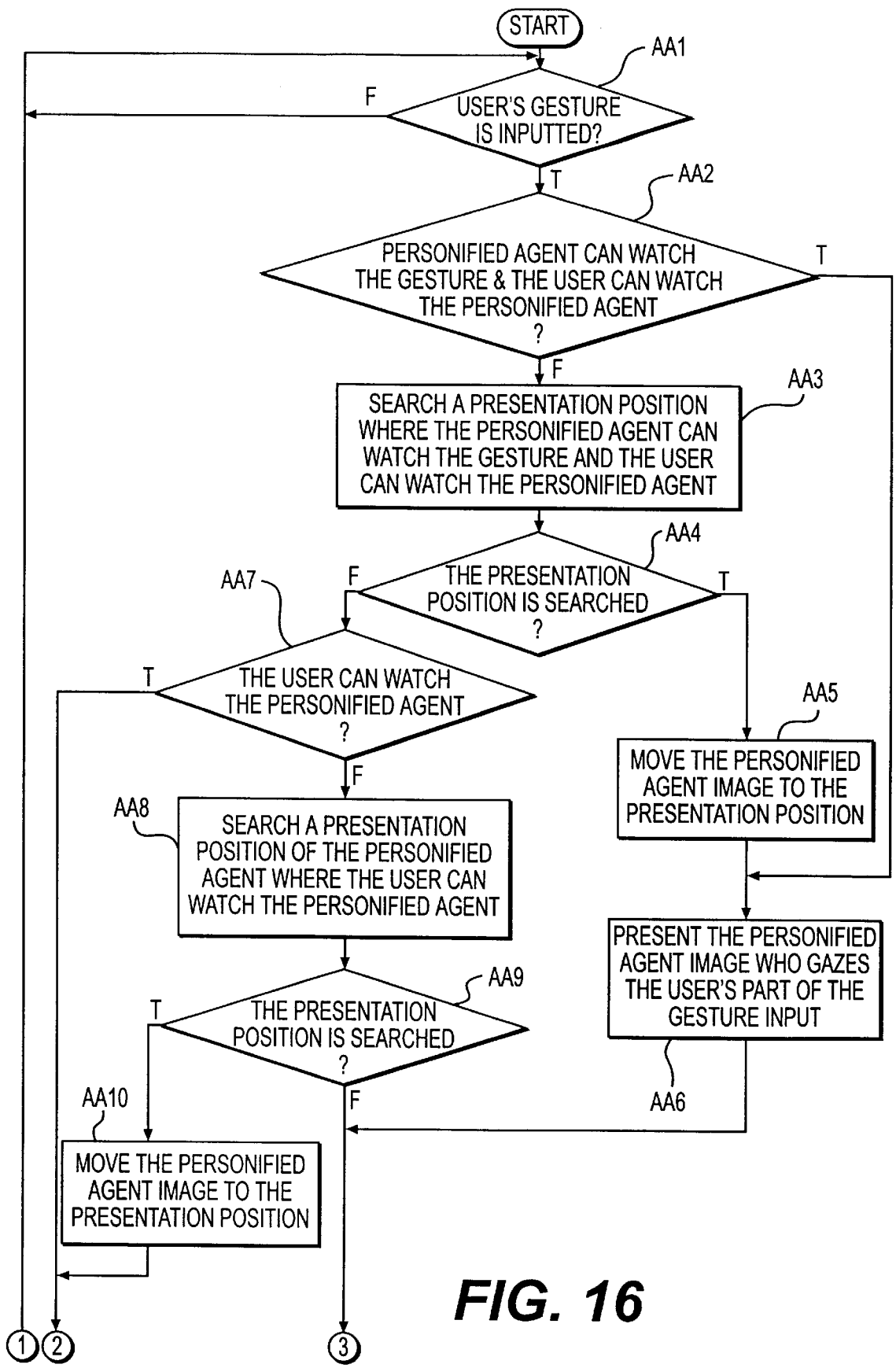
FIG. 16 is a flow chart of the first half processing of the multi-modal interface method according to the second embodiment.
Figure 17:
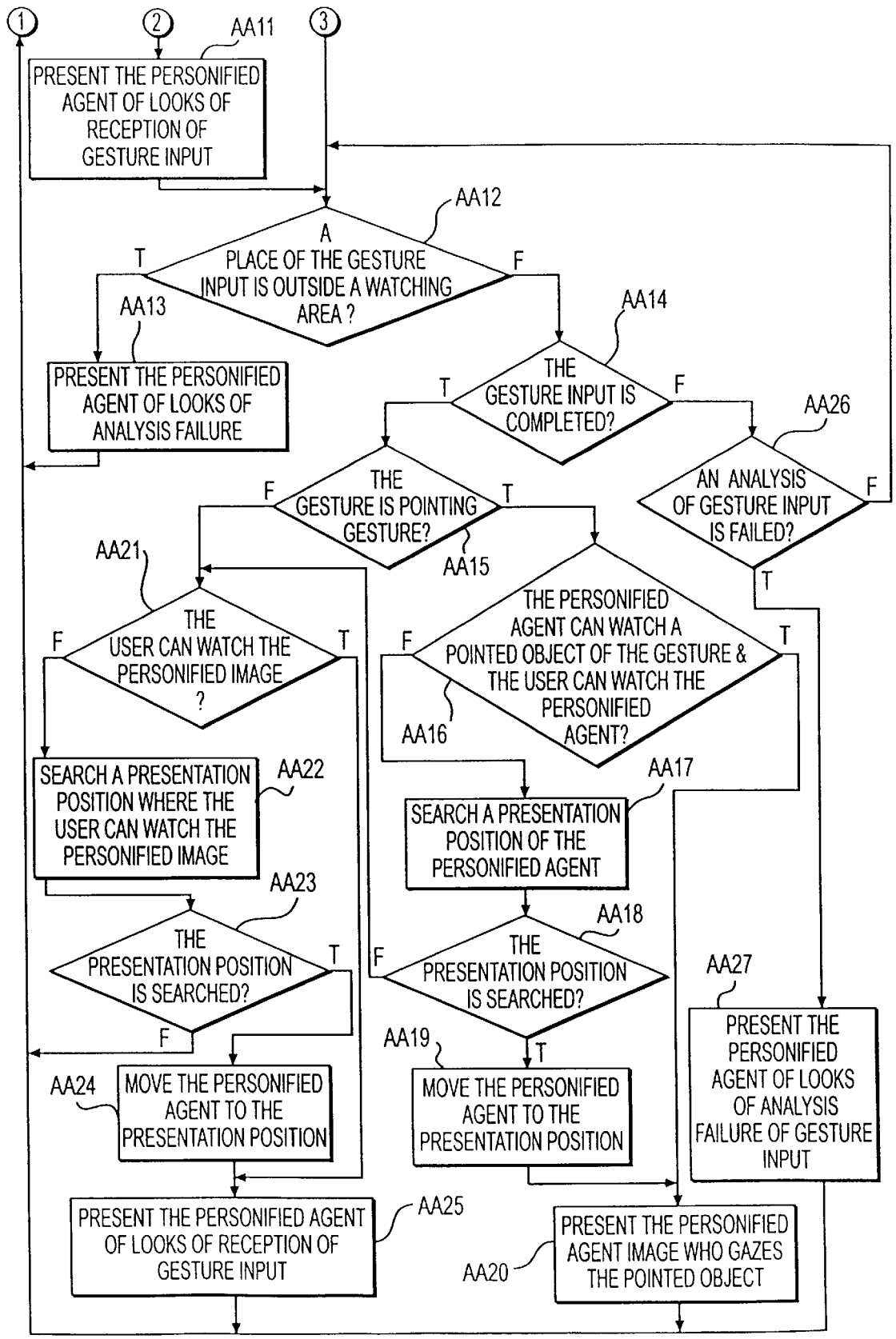
FIG. 17 is a flow chart of the second half processing of the multi-modal interface method according to the second embodiment.

In FIG. 13, the control section 1106 controls each processing of the input section 1101, the recognition section 1102, the feedback generation section 1103, the output section 1104 and the location information memory section 1105. The processing of the control section 1106 is explained in detail. FIG. 16 is a flow chart of the first half processing of the control section 1106 and FIG. 17 is a flow chart of the second half processing of the control section 1106. Assume that the input section 1101 includes the camera 1201. Assume that the recognition section 1102 recognizes the user's pointing gesture to the object or the place (reference object) in the real world and outputs position and direction of the reference object and the user. Assume that the feedback generation section 1103 generates the personified agent image who faces the user to supply the service by a still image or a dynamic image. The personified agent image gazes the reference object or the user's finger end of the gesture. In short, the looks or the action of the personified agent image is changed by the user's gesture input. Assume that the output section 1104 includes at least one CRT display.

The control section 1106 executes "processing AA", "processing BB", "processing CC", "processing DD", "processing EE". In this case, "processing AA" is a processing of the main routine as shown in FIGS. 16 and 17. "Processing BB" is a processing to decide whether the personified agent can watch the gesture input position of the user. "Processing CC" is a processing to decide whether the user can watch the personified agent image in case of presentation position Lc of the personified agent image. "Processing DD" is a processing to decide whether the personified agent can watch the reference object R pointed by the user's gesture G in case of presentation position Ld of the personified agent image. "Processing EE" is a processing to generate the personified agent image who gazes the reference object Z.

"Processing AA"

[step AA1] By using the action status information of the recognition section 1102, the processing is waited till the gesture input (G1) is detected first. If the gesture input is detected, the processing is forwarded to step AA2.

[step AA2] If personified agent of current (initial) presentation position Lj is decided to watch the place (position) Li where the user inputs the gesture Gi by "processing BB" and the user is decided to watch the personified agent image of the current presentation position Lj by "processing CC", the processing is forwarded to step AA6. Otherwise, the processing is forwarded to step AA3.

[step AA3] By referring to the location information memory section 1105, decision of "processing BB" and "processing CC" is orderly executed to each entry (store address) of all presentation positions. In short, a presentation position Lk of the personified agent who can watch the user position Li of the gesture input Gi and watched from the user's position Li is searched.

[step AA4] If the presentation position Lk is found, the processing is forwrded to step AA5. Otherwise, the processing is forwarded to step AA7.

[step AA5] By controlling the output section 1104, the personified agent image is moved to the presentation position Lk.

[step AA6] As controlling of the feedback generation section 1103 and the output section 1104, the personified agent image who gazes the user's place Li of the gesture input is generated and presented by "processing EE". The processing is forwarded to step AA12.

[step AA7] The personified agent image is decided to be watched from the user's place by "processing CC". If the personified agent image is watched, the processing is forwarded to step AA11. Otherwise, the processing is forwarded to step AA8.

[step AA8] By referring to the location information memory section 1105, decision of "processing CC" is orderly executed to each entry (store address) of all presentation positions. In short, a presentation position Lm of the personified agent who is watched from the user's position is serched.

[step AA9] If the presentation position Lm is found, the processing is forwarded to step AA10. Otherwise, the processing is forwarded to step AA12.

[step AA10] By controlling the output section 1104, the personified agent image is moved to the presentation position Lm.

[step AA11] By controlling the feedback generation section 1103, looks of the personified agent image who receives a pointing gesture input of the user is generated. For example, the looks is a nod. This personified agent image is presented to the user through the output section 1104.

[step AA12] By action status information from the input section 1101 or the recognition section 1102, if the user's place Li of the gesture input Gi is positioned outside the watch area of the input section 1101, the processing is forwarded to step AA13. Otherwise, the processing is forwarded to step AA14.

[step AA13] By controlling the feedback generation section 1103, the looks of the personified agent image representing an analysis failure of the gesture input is generated. For example, the looks is a surprise. This personified agent image is presented through the output section 1104. The processing is forwarded to step AA1.

[step AA14] By action status information from the recognition section 1102, if completion of the gesture input Gi is detected, the processing is forwarded to step AA15. Otherwise, the processing is forwarded to step AA26.

[step AA15] If a recognition result of the gesture input Gi is a pointing gesture, the processing is forwarded to step AA 16. Otherwise, the processing is forwared to step AA21.

[step AA16] If the personified agent is decided to watch the pointed object R1 of the pointing gesture Gi by "processing DD" and the user is decided to watch the personified agent by "processing CC", the processing is forwarded to step AA20. Otherwise, the processing is forwarded to step AA17.

[step AA17] By referring to the location information memory section 1105, decision of "processing DD" and "processing CC" is executed for each entry (store address) of all presentation positions. In short, the presentation position Ln of the personified agent who can watch the object R1 of the pointing gesture Gi and watched by the user is searched.

[step AA18] If the presentation position Ln is found, the processing is forwarded to step AA19. Otherwise, the processing is forwarded to step AA21.

[step AA19] By controlling the output section 1104, the personified agent image is moved to the presentation position Ln.

[step AA20] By controlling the feedback generation section 1103 using "processing EE", the looks of the personified agent image who gazes the reference object R1 of the gesture Gi is generated and presented to the output section 1104. The processing is forwarded to step AA1.

[step AA21] The user is decided to watch the personified agent image by "processing CC". If the user can watch the personified agent image, the processing is forwarded to step AA25. Otherwise, the processing is forwarded to step AA22.

[step AA22] By referring to the location information memory section 1105, the decision of "processing CC" is executed for each entry of all presentation positions. In short, the presentation position Lo of the personified agent watched by the user is searched.

[step AA23] If the presentation position Lo is found, the processing is forwarded to step AA24. Otherwise, the processing is forwarded to step AA1.

[step AA24] By controlling the output section 1404, the personified agent is moved to the presentation position Lo.

[step AA25] By controlling the feedback generation section 1103, the looks of the personified agent who receives the pointing gesture of the user is generated. For example, the looks is a nod. This personified agent image is presented through the output section 1104. The processing is forwarded to step AA1.

[step AA26] By action status information from the recognition section 1102, if the analysis failure of the gesture input is decided, the processing is forwarded to step AA27. Otherwise, the processing is forwarded to step AA12.

[step AA27] By controlling the feedback generation section 1103, the looks of the personified agent representing the analysis failure of the gesture input is generated. For example, the looks is an apology. This personified agent is presented through the output section 1104. The processing is forwarded to step AA1.

Next, "processing BB" is explained. In the "processing BB", as for presentation position Lb of the personified agent, the personified agent is decided to watch user's position Lg of the gesture input G such as the user's finger end.

[step BB1] By referring to the location information memory section 1105, a store address Pb of the presentation position Lb is obtained.

[step BB2] By referring to the location information memory section 1105, a store address Pg of the user's position G of the gesture input is obtained.

[step BB3] By using the representative position B(Xb, Yb, Zb) and the direction C(Ib, Jb, Kb) of the store address Pb and the representative position B(Xg, Yg, Zg) of the store address Pg, an inner product Ib between a vector (Xb-Xg, Yb-Yg, Zb-Zg) and a vector (Ib, Jb, Kb) is calculated.

[step BB4] If the inner product Ib is a positive value, the personified agent of the presentation position Lb is decided to watch the user's position Lg of the gesture input G. If the inner product Ib is a negative value, the personified agent is decided not to watch the user's position Lg.

Next, "processing CC" is explained. In the "processing CC", the user is decided to watch the personified agent image of the presentation position Lc.

[step CC1] By referring to the location information memory section 1105, a store address Pc of the presentation position Lc is obtained.

[step CC2] By referring to the location information memory section 1105, a store address Pu of the user's face position is obtained.

[step CC3] By using the representative position B(Xc, Yc, Zc) and the direction C(Ic, Jc, Kc) of the store address Pc and the representative position B(Xu, Yu, Zu) of the store address Pu, an inner product Ic between a vector (Xc-Xu, Yc-Yu, Zc-Zu) and a vector (Ic, Jc, Kc) is calculated.

[step CC4] If the inner product Ic is a positive value, the user is decided to watch the personified agent of the presentation position Lc. If the inner product Ic is a negative value, the user is decided not to watch the personified agent.

Next, "processing DD" is explained. In the "processing DD", the personified agent of the presentation position Ld is decided to watch the object R of the pointing gesture G.

[step DD1] By referring to the location information memory section 1105, a store address Pd of the presentation position Ld is obtained.

[step DD2] By referring to the location information memory section 1105, a store address Pr of the pointed object R is obtained.

[step DD3] By using the representative position B(Xd, Yd, Zd) and the direction C(Id, Jd, Kd) of the store address Pd and the representative position B(Xr, Yr, Zr) of the store address Pr, an inner product Id between a vector (Xd-Xr, Yd-Yr, Zd-Zr) and a vector (Id, Jd, Kd) is calculated.

[step DD4] If the inner product Id is a positive value, the personified agent of the presentation position Ld is decided to watch the object R of the pointing gesture G. If the inner product Id is a negative value, the personified agent of the presentation position Ld is decided not to watch the object R of the pointing gesture G.

Next, "processing EE" is explained. In the "processing EE", looks of the personified agent of the presentation position Le who gazes the gesture position or the pointed object is generated by the feedback generation section 1103.

[step EE1] By referring to the location information memory section 1105, a store address Pe of the presentation position Le is obtained.

[step EE2] By referring to the location information memory section 1105, a store address Pz of the pointed object z is obtained.

[step EE3] By using the representative position B(Xe, Ye, Ze) of the store address Pe and the representative position B(Xz, Yz, Zz) of the store address Pz, a vector=(Xe-Xz, Ye-Yz, Ze-Zz) is calculated.

[step EE4] A reference direction of the presentation position Le is calculated from the direction information C of the store address Pe. A looks of the personified agent facing to the vector Vf is generated as a front face of the reference direction.

In this way, the personified agent of the presentation position Lb is decided to watch the user's position of the gesture input or not. The user is decided to watch the personified agent of the presentation position Lc or not. The personified agent of the presentation position Ld is decided to watch the object R of the pointing gesture G or not. If the personified agent can watch the object R, the looks of the personified agent who gazes the object R is generated. In case of gaze impossible or analysis failure, the looks of the personified agent representing the purport is generated.

Figure 18:
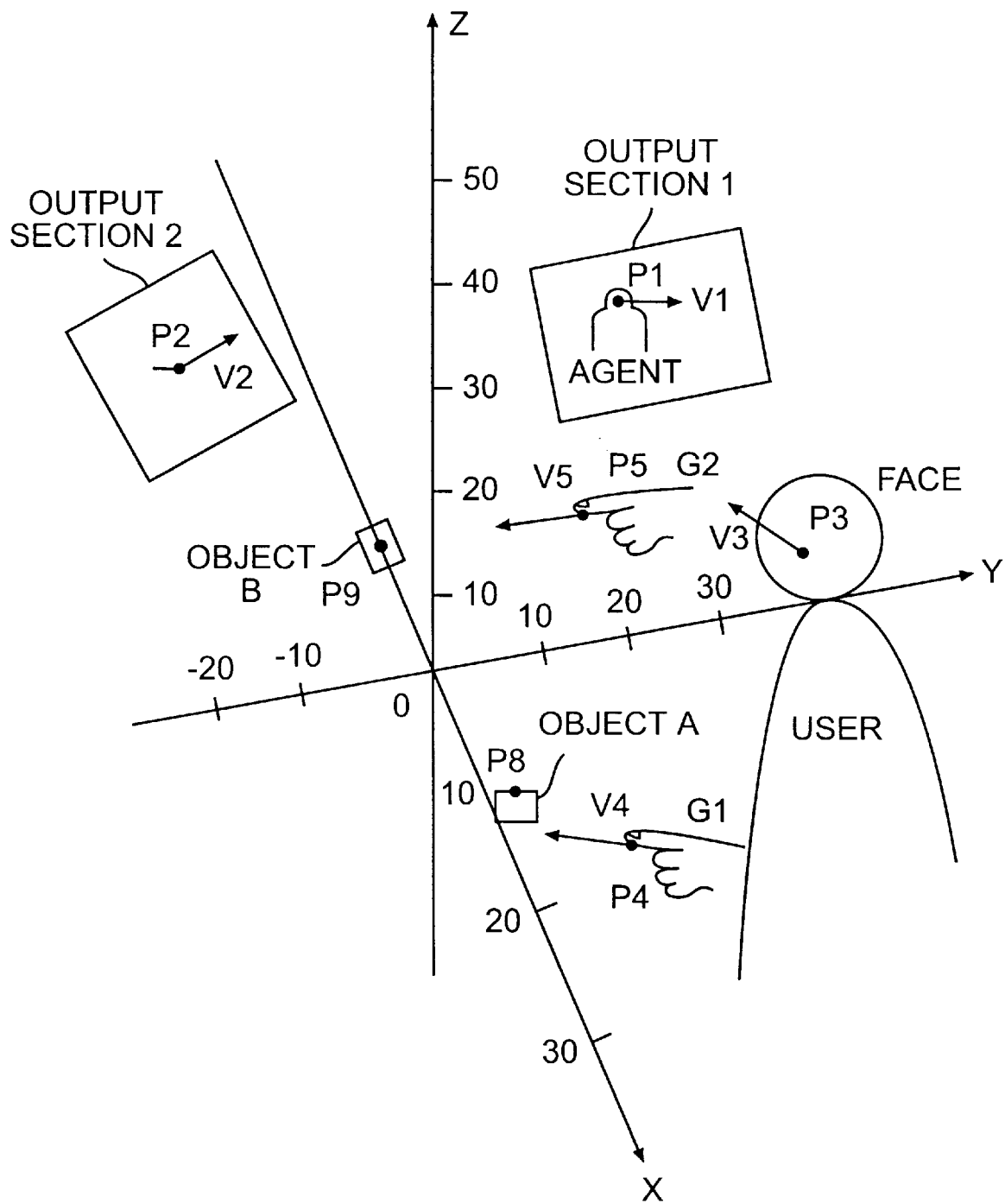
FIG. 18 is a schematic diagram of activation example in the multi-modal interface apparatus of the second embodiment.

Next, concrete example of the multi-modal interface apparatus of the second embodiment is explained. In this example, the input section 1101 includes a camera. The recognition section 1102 recognizes the user's face position, hand position and a pointed object position. The feedback generation section 1103 generates CG of the personified agent to smoothly prosecute a dialogue between the user and the system. The output section 1104 includes two displays. FIG. 18 is a schematic diagram of activation status of this example. In FIG. 18, X, Y, Z represent each axis of world coordinate system, and P1~P9 represent each plane. The place P1(coodinate P1=(10, 20, 40)) represents a presentation position 1 and an arrow V1 (a point coordinate V1=(10, 0, 1)) represents a vector of normal line direction of the presentation position 1. The place P2 (a coordinate P2=(-20, 0, 30)) represents a presentation position 2 and an arrow V2 (a point coordinate V2=(10, 10, 1)) represents a vector of normal line direction of the presentation position 2. The place P3 (a coordinate P3=(40, 30, 50)) represents the user's face position and an arrow V3 (a point coordinate V3=(-4, -3, -10)) represents a vector of the user's face direction. The place P4 (a coordinate P4=(40, 10, 20)) represents a position of the user's finger end at timing (T2~T8) and an arrow V4 (a point coordinate V4=(-1, -1, -1)) represents a vector of a pointing gesture direction. The place P5 (a coordinate P5=(20, 10, 20)) represents a position of the user's finger end at timing (T14~T15)) and an arrow V5 (a point coordinate V5=(-1, -1, -1)) represents a vector of a pointing gesture direction. The place P8 (a coordinate P8=(30, 0, 10)) represents a position of the pointed object A of the user's gesture at timing (T2~T8). The place P9 (a coordinate P9=(0, -10, 0)) represents a position of the pointed object B of the user's gesture at timing (T14~T15). These informations of position and direction are previously stored or detected by the recognition section 1102 to analyze the image information and orderly stored in the location information memory section 1105.

Next, each processing of this example is explained.

<processing example 1>

In this case, when the user inputs the pointing gesture, the personified agent image who gazes the pointed object is presented to the user as feedback information.

[T1] Assume that the personified agent image is displayed at the presentation position P1.

[T2] The user acts the pointing gesture G for the object A.

[T3] The recognition section 1102 detects a start of the gesture G1 by analyzing the input image and outputs the action status information to the control section 1106.

[T4] The processing is forwarded from step AA1 to step AA2 in "processing AA".

[T5] "Processing BB" is executed by referring to the store address P1, P4 in the location information memory section 1105. The personified agent of the presentation position P1 is decided to watch the user's position P4 of the gesture G1.

[T6] "Processing CC" is executed by referring to the store address P1, P3 in the location information memory section 1105. The personified agent of the presentation position P1 is decided to be watched from the user's face position P3.

[T7] By "processing EE" at step AA6, the personified agent image who gazes the user's gesture G1 is generated by the feedback generation section 1103 and presented to the user through the output section 1104.

As mentioned-above, when the user begins to act the gesture input, the personified agent who gazes the user's hand or finger of the gesture input is presented to the user.

[T8] The processing is forwarded to step AA12. In this case, the gesture G1 is decided to be positioned outside the watch area of the input section 1101.

Assume that the gesture G1 is not positioned outside the watch area of the input section 1101 and the processing is forwarded to steo AA14.

[T9] At step AA14, the control section 1106 decides whether the user's gesture is completed by the action status information of the recognition section 1102. Assume that completion of the gesture G1 is informed as the action status information. Accordingly, the control section 1106 recognizes the completion of the gesture G1.

[T10] At step AA15, the control section 1106 decides whether the gesture G1 points to an object. In this case, the gesture G1 is a pointing gesture. Accordingly, the processing is forwarded to step AA16 by the action status information of the recognition section 1102.

[T11] At step AA16, "processing DD" is executed by referring to the store address P1, P8 in the location information memory section 1105. In this case, the pointed object A of the gesture G1 is decided to be watched by the personified agent.

[T12] "Processing CC" is executed by referring to the store address P1, P3 in the location information memory section 1105. In this case, the user is decided to watch the personified agent image. The processing is forwarded to step AA20.

[T13] At step AA20, "processing EE" is executed by referring to the store address P1, P8 in the location information memory section 1105. In this case, the personified agent image who gazes the position P8 of the pointed object A is generated and presented to the user.

As mentioned-above, when the user acts the pointing gesture, the personified agent image who gazes the pointed object is presented to the user as feedback information.

<processing example 2>

[T21] Assume that the user begins to act a pointing gesture G2 for the object B of position P9.

[T22] In same way of T2~T7, the personified agent who gazes the gesture G2 is presented to the user.

[T23] At step AA16, "processing BB" is executed by referring to the store address P1, P9 in the location information memory section 1105. In this case, it is decided that the position P9 of the gesture G2 is not watched from the presentation position P1 of the personified agent.

[T24] At step AA17, the decision of "processing DD" is executed for each store address (P1, P2, . . . ) of all presentation positions in the location information memory section 1105. A presentation position of the personified agent image who can watch the object B of the pointing gesture G2 and watched from the user's position P3 is searched. In the example of FIG. 15, the presentation position 2 is found.

[T25] At step AA19, the personified agent image is moved to the presentation position P2 through output section 1104. The processing is forwarded to step AA20.

[T26] In same way of T13, the personified agent image who gazes the pointed object B is presented to the user as feedback information of the gesture G2.

As mentioned-above, even if the object pointed by the user is not watched from a current presentation position of the personified agent image, the personified agent image is moved to another presentation position from where the pointed object is watched. In short, adequate feedback is presented to the user.

If the gesture input of the user (user's finger end) is not watched from the current position of the personified agent image, the personified agent image is moved to a suitable presentation position by processing of step AA3. If this kind of movement is impossible, the personified agent image whose looks is a nod is presented by processing of steps AA7~AA11.

If the user's hand or finger end is positioned outside the watch area of the camera during the user's action of the gesture input, the personified agent image whose looks is a surprise is presented by processing of steps AA12~AA13.

If the user's gesture input is not the pointing gesture, a presentation position of the personified agent is moved and a nod looks is presented as feedback. Furthermore, if recognition of the gesture input is failed, the personified agent image whose looks is an apology is presented by processing of step AA27.

In the second embodiment, the personified agent image gazes the user's gesture part or the pointed object as the feedback information. However, the personified agent image may act a pointing gesture to indicate the user's gesture part or the pointed object.

In the second embodiment, the user acts a pointing gesture for a object or a place. However, the user may act a circling gesture to surround a space area. In this case, the personified agent image gazes the user's finger of the circling gesture or the surrounded space area. Furthermore, for example, if the system (multi-modal interface apparatus) informs a physical position of some object in the real world such that a floppy drive to the user, the personified agent image may gaze a direction toward the physical position. In this case, the user easily recognizes the physical position in the system.

In the second embodiment, the location information memory section previously stores the position information of the output section and the user. However, a magnetic sensor may be attached to the output section or the input section may observe a change of the system environment on occasion. In this case, when a position change of the input section or the user is detected, a content of the location information memory section is dynamically updated according to the position change. Furthermore, the output section is physically realized by a plurality of display apparatus or a plurality of area in one display apparatus.

In same way of the first embodiment, the second embodiment can be realized by a general computer to store the program of the multi-media interface method. In this case, as shown in FIG. 12, the general computer includes a CPU 301, a memory 302, a large capacity external memory 303, a communication interface 304. Input interface 305a~305n, input devices 306a~306n, output interface 307a~307n, output devices 308a~308m, are equipped to the general computer. The processing of the second embodiment is executed by software processing of the CPU 30. The program to load to the CPU is stored in a magnetic disk (Floppy Disk, Hard Disk), an optical disk (CD-ROM, DVD), a semiconductor disk, which are distributed. Therefore, if the program as this recording media is read by the computer and executed by the CPU 301, function of the multi-modal interface apparatus of the second embodiment can be realized.

Figure 19:
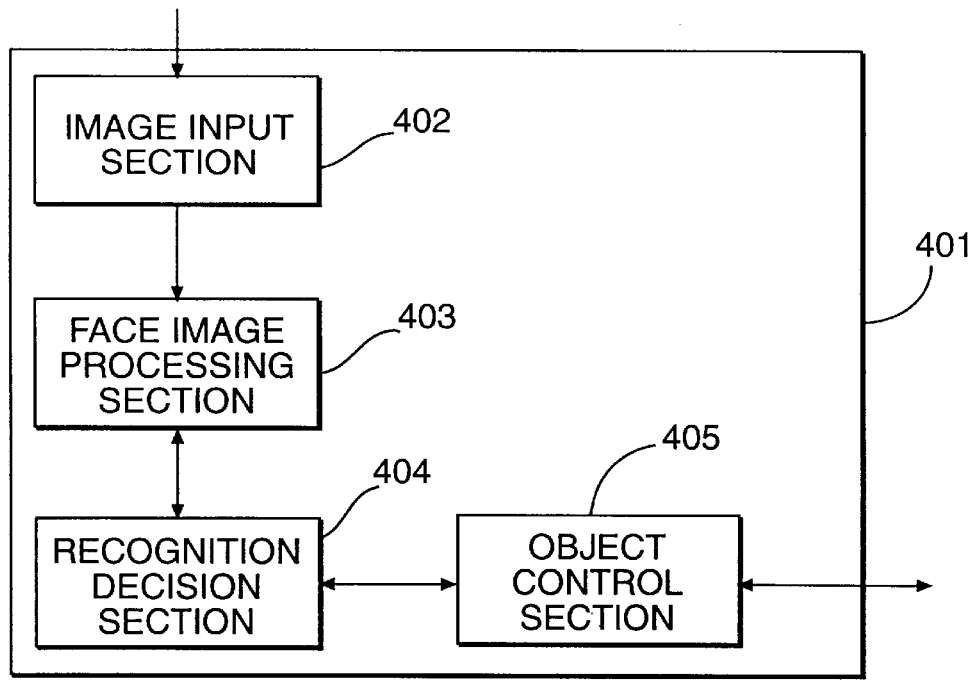
FIG. 19 is a block diagram of the multi-modal interface apparatus according to a third embodiment of the present invention.

FIG. 19 is a block diagram of the multi-modal interface apparatus according to a third embodiment of the present invention. As shown in FIG. 19, the multi-modal interface apparatus 401 is comprised of an image input section 402, a face image processing section 403, a recognition decision section 404, an object control section 405. The image input section 402 inputs the user's face image by using normal TV camera. The image input is monochrome, but may be color in case the color information is necessary for the face image processing section 403. The image input section 402 may include a plurality of cameras. The camera may be not only a fixed type but also control type of a focus, a stop and a zoom. The active camera along pan and tilt direction may be used.

Figure 20:
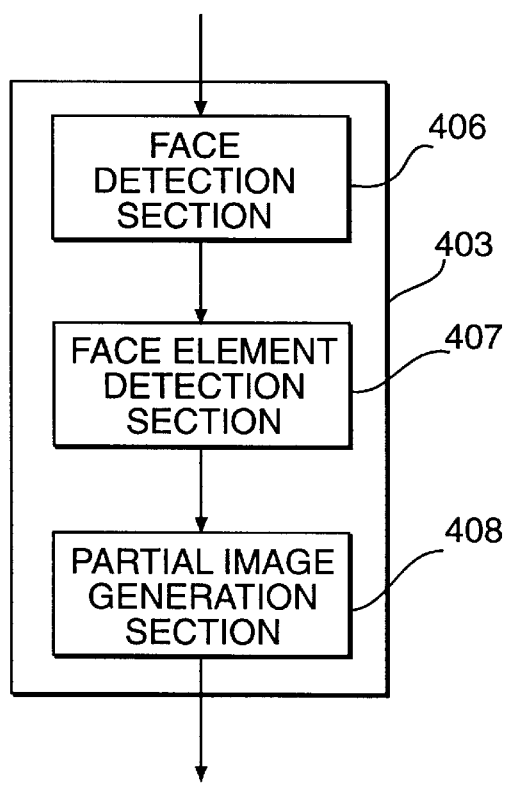
FIG. 20 is a block diagram of a face image processing section 403 according to the third embodiment of the present invention.

FIG. 20 is a block diagram of the face image processing section 403. As shown in FIG. 20, the face image processing section 403 is comprised of a face detection section 406, a face element detection section 407, a partial image generation section 408. The face detection section 406 executes. Affine transformation (translation, magnification, rotation) and extracts a part image (face image) of predetermined size. Concretely speaking, as shown in FIG. 21, the input image is reduced by a plurality of steps. In each reduction image, the predetermined size image (N pixels×N pixels) is extracted by raster scan. As for each extracted image, similarity for the dictionary pattern (reference dictionary pattern) of the face image is calculated. In this case, subspace method is used. In the subspace method, sample image is converted by K-L expansion (Principal Component Analysis) and normal orthogonal basis (eigenvector) is calculated as the dictionary pattern. Sum of inner product between the input face image (the partial image) and the dictionary pattern (eigenvector) for each category is calculated as the similarity. The partial image is decided to be belonged to the category of the highest similarity. As for the similarity S of the part image G, the calculation is executed by using the eigenvector $\phi=(\phi 1, \ldots \phi m)$ as follows.

$$S = \sum_j (\phi j, G)$$

In the part image, a square position of the highest similarity is decided as the face area as shown in low center part of FIG. 21. The face element detection section 407 detects face elements such as eyes, a nose, a mouse from the face area. In the third embodiment, a pupil (eye) and a nostril (nose) are detected as the face element. Concretely speaking, as for the face area image of FIG. 22A, a plurality of circle areas are extracted by a separation mask as shown in FIG. 22B. In a plurality of combinations of four circle areas (two pupils, two nostrils), one combination is selected as facial eye-nose candidate. In decision of the facial candidate, spring model between the eye-nose representing component feature is compared with each candidate of four circle areas. In this way, as shown in FIG. 22C, one facial candidate is correctly selected as positions of the pupils and the nostrils. The part image generation section 408 extracts face square area based on the positions of the pupils and the nostrils as shown in FIG. 22D. Concretely speaking, based on the four positions of the two pupils and the two nostrils, the face area image is requantized to generate a normalized image. The predetermined size is, for example, 15×15 pixels. As shown in FIG. 22D, two vectors are set by the four position of the two pupils and the two nostrils. A gray value at position of linear combination of the vector is the pixel value of the extracted face square area as shown in FIG. 22E. In case the face square area is extracted by using the face element position (pupil, nostril), the pixel values are different according to face direction and pupil position. FIG. 23A shows the pixel values in case of the face direction of upper side. FIG. 23B shows the pixel values of lower side. FIG. 23C shows the pixel values in case of the face direction of left side. FIG. 23D shows the pixel values in case of the face direction of right side. Therefore, the face direction is detected by using a distribution of the pixel values without detecting the user's gaze direction.

Figure 24:
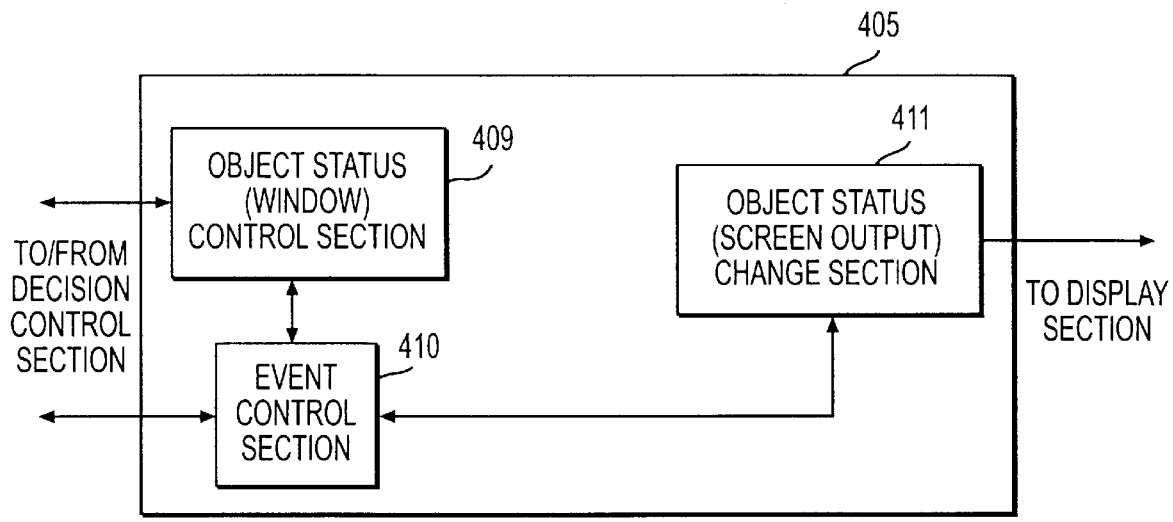
FIG. 24 is a block diagram of an object control section 405 according to the third embodiment of the present invention.

FIG. 24 is a block diagram of the object control section 405. As shown in FIG. 24, the object control section 405 is comprised of an object status (window) control section 409, an event control section 410, an object status (screen output) change section 411. The object status control section 409 controls status information of object to generate, manage, delete. As one example, assume that the object control section 18 is a window manager in a window system of the computer. In this case, the object status (window) control section 409 manages attribute of position, size of the window and overlap situation of the windows. Each window is registered as a size (w, h), a position (x, y), a name, an ID number (identifier) as follows when the window is generated.

((x, y), (w, h), (name), (ID number))

In order to detect the overlap situation of the windows, the situation how to overlap one window to other window is calculated by using the size (w, h) and the position (x, y), and registered. The event control section 16 controls event information such as a prepared device to operate the object and, object processing. The event is a minimum unit of operation such as operation information or operation content of the object. In the example of the window system, the event is a mouse movement, a button operation, a window operation, a key input and represented as follows.

(event type, window ID of the event, value of the event)

The event control section 410 processes the event inputted from the device such as the mouse and the keyboard, and indicates the change of the display in case the event is occurred. For example, the user inputs for the window through the keyboard, the event is occurred from the window system and sent to the event control section 410. The event control section 20 decides which window to send the event. In short, the window selected by the user is managed (This event is called "focus"). The object status change section 411 changes status of each object and controls a display of the object. In case of the window manager, the object status (screen output) change section 411 changes the display of the window such as drawing the character, the figure, the image in the window, movement of the mouse cursor. For example, if the focus object is changed by the mouse movement, color of window frame changes. If the window is indicated by the mouse movement, the window is actually moved on the display.

Figure 25:
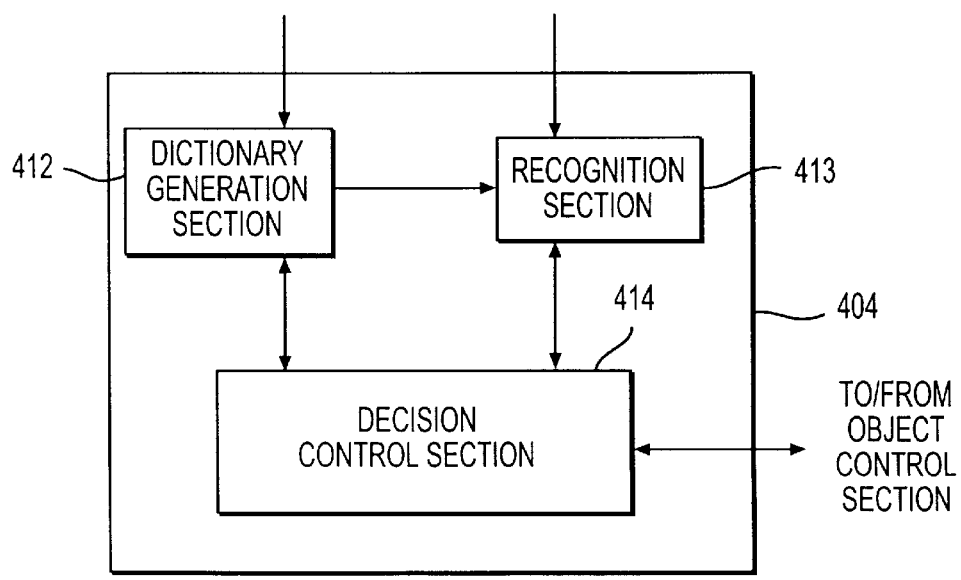
FIG. 25 is a block diagram of a recognition decision section 404 according to the third embodiment of the present invention.
Figure 26:
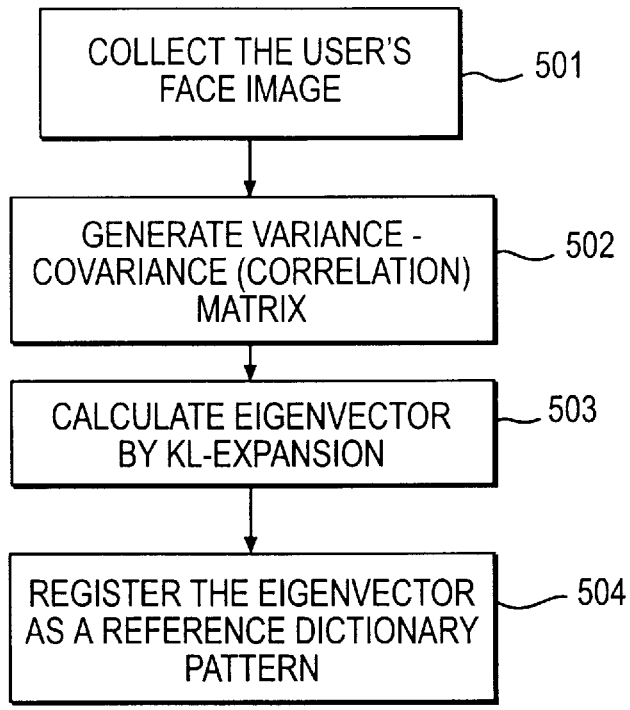
FIG. 26 is a flow chart of processing of a dictionary generation according to the third embodiment of the present invention.

FIG. 25 is a block diagram of the recognition decision section 404. As shown in FIG. 25, the recognition decision section 404 is comprised of a dictionary generation section 412, a recognition section 413, a decision control section 414. The dictionary generation section 412 generates the dictionary pattern for recognition by using feature value extracted by the face image processing section 403. In this case, the dictionary pattern is generated from a plurality of face area images extracted. FIG. 26 is a flow chart of processing of the dictionary generation section 412. First, a plurality of the extracted face images are collected until number of collected images is equal to a predetermined number (step 501). When the number of collected images reaches the predetermined number, a variance-covariance matrix (or correlation matrix) is calculated from the collected face images (step 502). By K-L expansion of the variance-covariance matrix (or correlation matrix), eigenvalue and eigenvector of the matrix are calculated (step 503). Concretely speaking, the matrix calculation of yacobi method or LU decomposition is executed. Next, the eigen values are rearranged in order that corresponding eigenvalue is larger. Several eigenvalues at high rank are selected and registered as the dictionary pattern (step 504). A plurality of the dictionary pattern may be registered and arbitrarily deleted. The recognition section 413 compares a new extracted face image with each dictionary pattern generated by the dictionary generation section 412. By using abovementioned subspace method, the similarity Si of the new extracted face image G is calculated by i-th dictionary pattern (eigenvector) $\phi i$ as follows.

$$Si = \sum_j (\phi ij, G)$$

Figure 27:
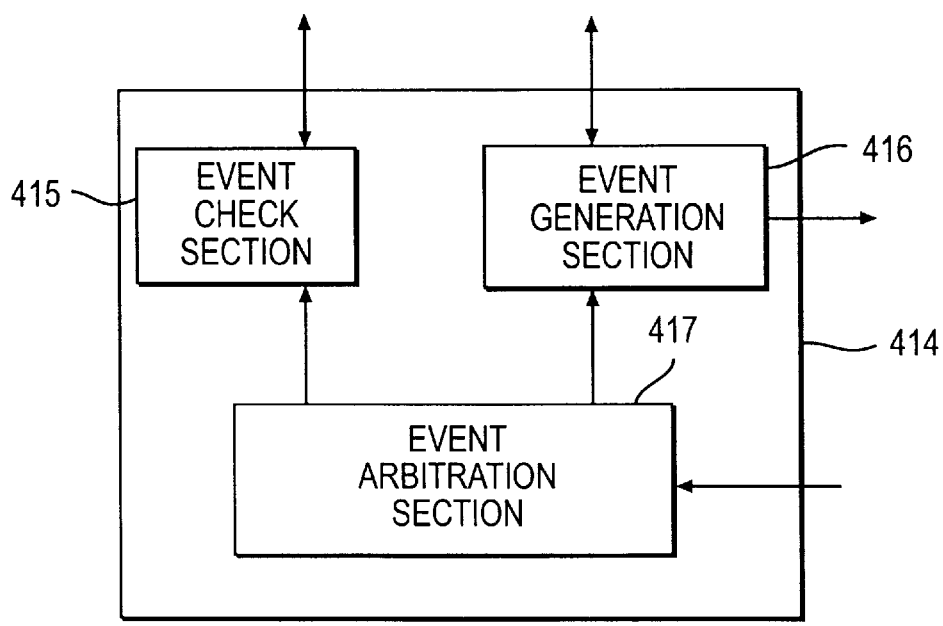
FIG. 27 is a block diagram of a decision control section 411 according to the third embodiment of the present invention.

In this case, as for all Si, the category of the dictionary pattern of the largest Si is selected as the new extracted face image. The decision control section 414 receives information from the object control section 405, controls recognition and dictionary generation, and indicates to the object control section 405. FIG. 27 is a block diagram of the decision control section 414. As shown in FIG. 27, the decision control section 414 is comprised of an event check section 415, an event generation section 416, the event arbitration section 417. The event arbitration section 417 receives the event from the object control section 405, decides whether the event is related, and distributes the event to the event check section 415 and the event generation section 416. In this case, in order to select the event related for the user's gaze to the window, the event check section 415 checks the event type and the window ID in which the event is occurred.

Figure 28:
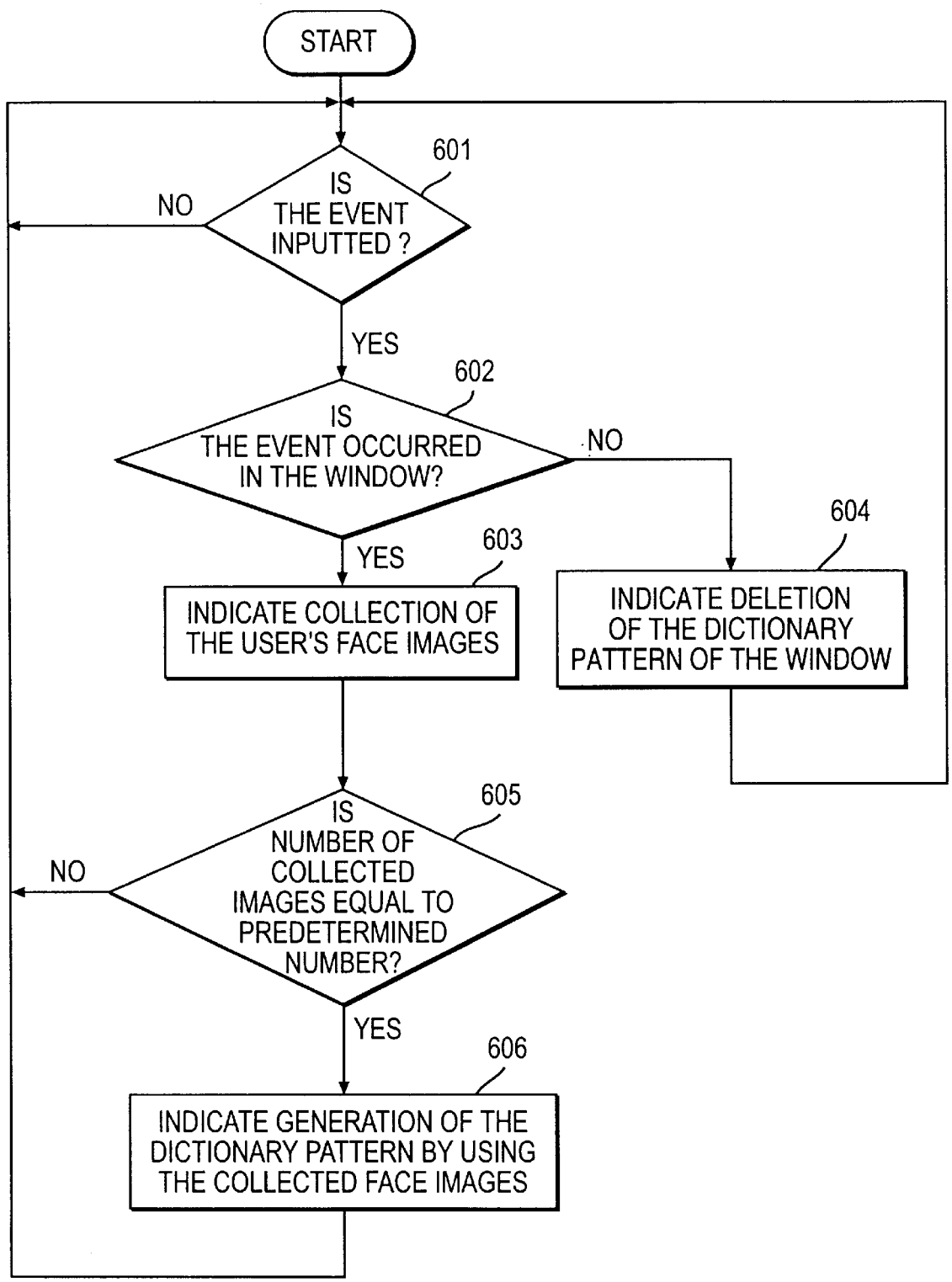
FIG. 28 is a flow chart of processing of an event arbitration section 417 according to the third embodiment of the present invention.

FIG. 28 is a flow chart of processing of the event check section 415. First, the event is received from the object control section 405 (step 601). If the event is directly occurred in the window (step 602), the window ID is checked and an indication signal of collection of face images is outputted to the dictionary generation section 412 (step 603). If number of collected face images is equal to the predetermined number (step 605), an indication signal of dictionary generation is outputted to the dictionary generation section 412 (step 606). If the event is not a direct operation in the window but a change operation of the window position such as movement/deletion of the window (step 602), an indication signal of deletion of the dictionary pattern for the window is outputted to the recognition section 413 (step 604).

Figure 29:
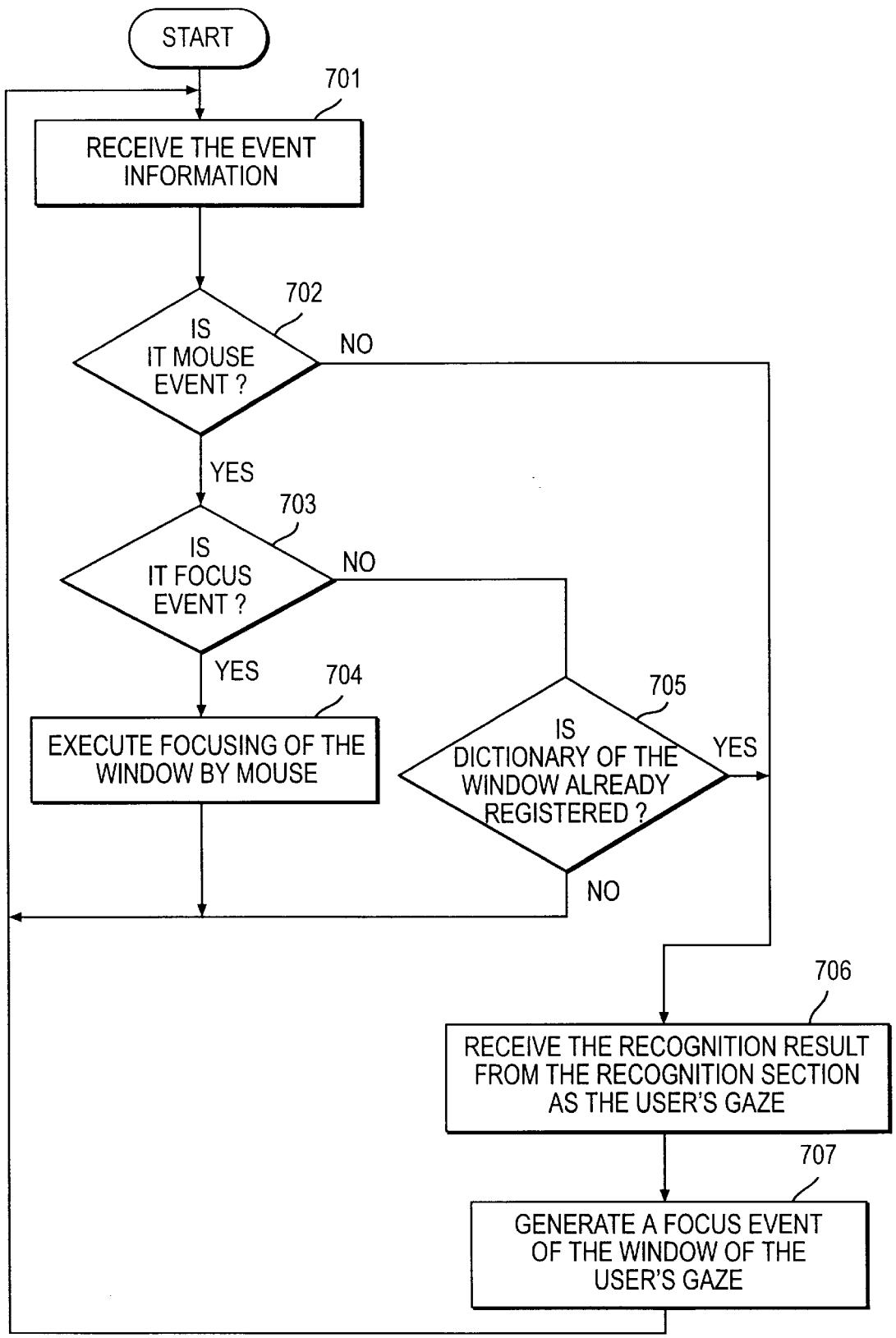
FIG. 29 is a flow chart of processing of an event generation section 416 according to the third embodiment of the present invention.

FIG. 29 is a flow chart of processing of the event generation section 416. First, the event information is received from the object control section 405 (step 701). If the received event is not a mouse event (step 702), the recognition result is received from the recognition section 413. If the recognition result is a situation that the user gazes the window (step 706), a focus event of the window is generated and outputted to the object control section 405 (step 707). If the received event is the mouse event (step 702) and the focus event of the window (step 703), the window is focused by the mouse (step 704). In short, the user operates focusing of the window by his mouse. If the mouse event is not the focus event of the window (step 703), the dictionary pattern of the window is decided to be already registered or not in the recognition section 413 (step 705). If the dictionary pattern of the window is already registered, the processings of the steps 706 and 707 are executed as mentioned-above.

Next, concrete example processed by the multi-modal interface method of the third embodiment is explained.

(1) WINDOW MANAGER

Figure 30A:
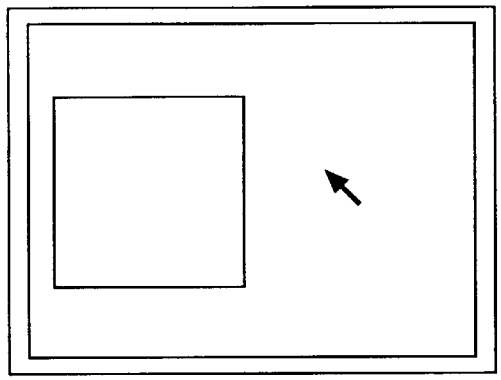
FIGS. 30A to 30F are schematic diagram of operation of window focus.
Figure 30B:
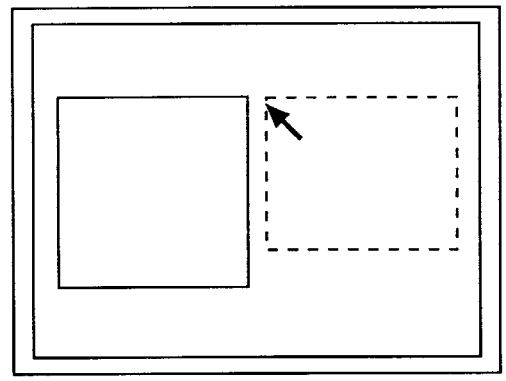
Figure 30C:
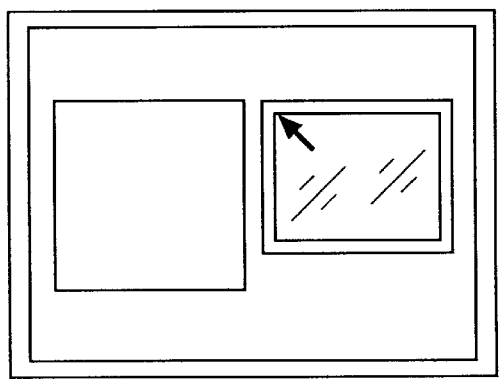
Figure 30D:
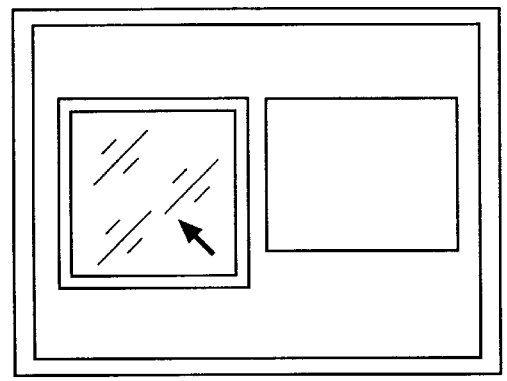
Figure 30E:
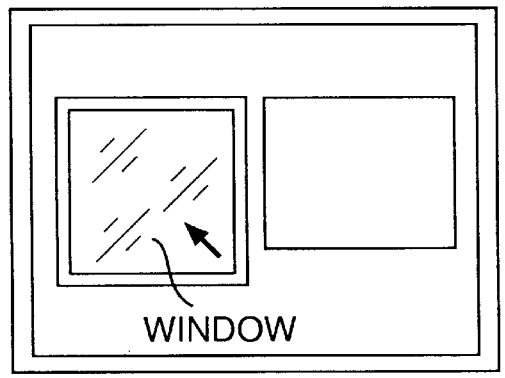
Figure 30F:
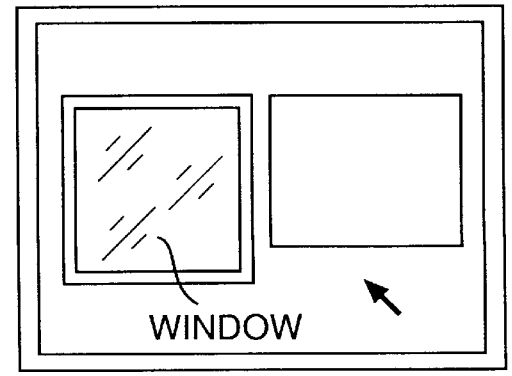
Figure 31:
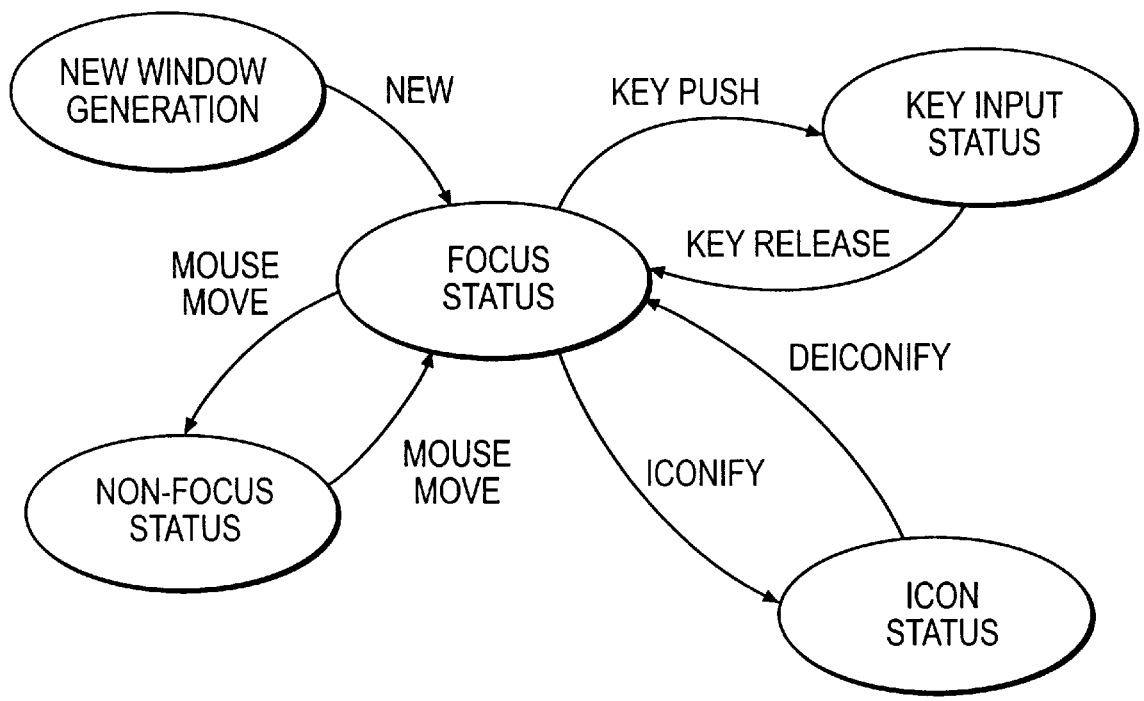
FIG. 31 is a schematic diagram of state transition diagram between the window states.

Assume that the multi-modal interface method is applied for the window system including input of the display (GUI) in a personal computer or a work station. In case of window focusing, one window to be focused is selected from a plurality of windows on the display through the keyboard. In the window system of the prior art, in order to focus two windows, the user respectively moves the mouse cursor in the two windows as shown in FIGS. 30C and 30D. Each window to be operated is focused. In the third embodiment, while the user operates the window focus by the mouse, the user's face image is inputted. The dictionary pattern is generated by the user's face image, and registered in correspondence with the window. The user's face image newly inputted is recognized by using the dictionary pattern. If the user's face image is similar to the dictionary pattern, the window corresponding to the dictionary pattern is automatically focused. In this case, the user's face image is inputted by a camera set neighboring the display of the personal computer or the workstation. In the third embodiment, the camera is located at lower side of the display and an angle of elevation of the camera is set in proportion to the user's face position. As shown in FIG. 30A, assume that one window is existed in the display. As shown in FIG. 30B, the user creates new window by the mouse cursor. This new window is focused by mouse click as shown in FIG. 30C. FIG. 31 is a block diagram of status transition chart of the window. Each node of an ellipse represents a status and each arc represents an event type of operation. "new" is generation of new window, "key push", "key release" represent an input from the keyboard, "mouse move" represents a movement of the mouse, "iconify", "Deiconify" respectively represent iconity of the window and deiconity of the iconized window. For example, (mouse move, 123, (x, y)) represents that the mouse is moved to a position (x, y) in the window 123. A change from FIG. 30B to FIG. 30C represents a transition from "NEW WINDOW GENERATION" to "FOCUS STATUS". When the new window is generated, the window control section 409 registers (ID, position, size, name) of the new window. Then, the ID is sent to the decision control section 414. In case of the transition between "FOCUS STATUS" and "KEY INPUT STATUS", i.e., while the user is operating in focused window, the decision control section 414 indicates collection of the user's face image to generate the dictionary pattern to the dictionary generation section 412. Especially, in case of "KEY INPUT STATUS", the user's face images are collected not only at timing of a key push but also at all times of the key push continuously. The dictionary generation section 412 executes dictionary generation of the window ID when number of collected face images reaches the predetermined number. The dictionary generation section 412 sends the window ID of generated dictionary pattern to the decision control section 414. The decision control section 414 sends the update information of the dictionary pattern (the window ID) to the recognition section 413. The recognition section 413 receives the generated dictionary pattern of the window ID from the dictionary generation pattern 412. Hereafter, the recognition section 413 sends the window ID as the recognition result to the decision control section 413 when the face image newly inputted is recognized by the dictionary pattern. In FIGS. 30C and 30D, the dictionary pattern is respectively generated for the two windows. The decision control section 414 receives event information from the window control section 409 and decides whether a movement of the mouse (mouse event) is operated. In case the mouse event is not occurred, by using the recognition result (window ID) from the recognition section 413, the decision control section 414 sends an event to focus the window of the ID to the window control section 409. The window control section 409 outputs an indication signal of the window focus to the screen output change section 411. In the prior art, the user can focus the window by moving the mouse cursor in the window as shown in FIG. 30E. However, in the third embodiment, even if the mouse cursor is located outside the window as shown in FIG. 30F, the user can focus the window when he gazes the window.

Next, movement/deletion of the window is explained. In the above explanation, the window to which the user gazes is focused. However, when the window is moved or deleted by mouse operation, the dictionary pattern to use for the window focus is necessary to update. First, when the window is moved or deleted by mouse operation, the event control section 410 detects the movement/deletion of the window. The event control section 410 sends the window ID of moved/deleted window to the decision control section 414. The decision control section 414 indicates deletion signal of the dictionary pattern of the window ID to the recognition section 413. When a new event of window focus of the window ID is occurred by the mouse, the decision control section 414 indicates collection of the user's face image to generate the dictionary pattern to the dictionary generation section 412 as mentioned above.

Next, iconify of the window is explained. When the window is changed to the icon, the decision control section 414 outputs stop signal of recognition processing (similarity calculation) for the window to the recognition section 412. In this case, the icon of the window is not focused. When the icon of the window is returned to the window, the recognition section 412 executes the recognition processing again.

(2) DETECTION OF GAZE DIRECTION

As shown in FIGS. 23A~23D, the face direction is decided by distribution of pixel values of the user's face image. Area of the display to which the user gazes is decided by unit of nine divided areas. In this case, calibration is necessary. In short, the feature values of the user's face image which gazes each divided area are previously obtained and registered as the dictionary pattern of each divided area. In the third embodiment, a following calibration is realized by the mouse operation. FIGS. 32A~32D show the display screen consisted of nine divided areas. As for a first area to which the mouse cursor is located by the user's operation, the face image which the user gazes the first area is inputted and a color of the first area changes in proportion to number of inputted face images as shown in FIGS. 32A and 32B. In case the user moves the mouse cursor to a second area as shown in FIG. 32C, the color change of the first area is stopped. The face image which the user gazes the second area is inputted and a color of the second area changes in proportion to number of inputted face images as shown in FIG. 32D. The color of the second area is darker than the color of the first area as shown in FIG. 32D because number of the inputted face images of the second area is larger than number of the inputted images of the first area. Then, as shown in FIG. 32E, input processing of the user's face image is executed for each area. When the color of all area becomes same dark color as shown in FIG. 32F, input processing of the user's face image is completed because almost equal number of the face image is obtained for each area. In order to realize this processing, the window is previously assigned to each divided area. As for the window (one area) in which the mouse cursor is located, the dictionary pattern is generated from the inputted face images. In this case, the window control section 409 indicates the screen output change section 411 to change the color of the window in proportion to number of the inputted face images. When the color of all area changes by same dark color, the user can recognize completion of the dictionary generation for each area. Hereafter, by referring to the dictionary pattern, one area which the user gazes is selected as a menu or focused as a window.

(3) REMOTE CONTROLLER

As an example of home electric equipment, application for selecting channel of television by a remote controller is explained. As shown in FIG. 33, when the user gazes predetermined position (A, B, C, D) around TV screen, the channel is automatically changed without the user's operation of the remote controller. A situation that the user gazes the predetermined position corresponds to the event. First, the image input section is set to the TV and inputs the face image which the user gazes the predetermined position (A, B, C, D) when he selects the channel. The dictionary pattern is generated from the user's face image and registered with the user's selected channel. Hereafter, if the user gaze the predetermined position only, the TV channel is automatically selected (turn on, changed) without the user's operation. In this case, the user's eye position in front of the TV often changes. In order to cope with this situation, the dictionary pattern may be updated in proportion to the user's eye position. In other words, each user's eye position is regarded as kind of event. Therefore, a plurality of the dictionary patterns may be previously registered in accordance with each user's eye position.

(4) SUPPORT OF OTHER MEDIA

As an example of speech recognition device, application for controlling the home electric equipment or a social system by the speech recognition is explained. In case of the system used by the speech recognition, error recognition are often occurred. The recognition ratio is effected by the user's speech situation and a mic direction. Therefore, the user's speech information to be registered is supplemented by the user's face image. At the registration mode, the user's face image is inputted while the user is speaking a predetermined word to be registered. The feature of the user's face image is registered as the dictionary pattern. In case of a plurality of words to be registered, each word is regarded as one event. In this case, the user's face image is inputted whenever the user is speaking each word to be registered. The feature of each face image is registered as each dictionary pattern. For example, a shape of the user's lip is registered as the feature for each registered word. Hereafter, even if the user's speaking word is not identified by speech recognition, the user's face image inputted during his speaking is compared with the dictionary pattern for each registered word. One registered word whose similarity is largest is selected as the user's speaking word. In this way, a ratio of the speech recognition raises by using the face image recognition.

In same way of the first and second embodiments, a memory can be used to store instructions for performing the process described in the third embodiment, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. Multi-modal interface apparatus, comprising:

gaze object detection means for detecting a user's gaze object;

media input means for inputting at least one medium of sound information, character information, image information and operation information from the user;

personified image presentation means for displaying an agent image to the user, the agent image expressing predetermined gesture and looks as non-language message, the predetermined gesture and looks being different based on a kind of the user's gaze object;

information output means for outputting at least one medium of sound information, character information and image information to the user;

interpretation rule memory means for previously storing a plurality of rules consisting of a present status information, a gaze object information, a kind of input information or output information, an interpretation result information, wherein the present status information represents a status of the apparatus, the gaze object information represents the kind of the user's gaze object, the kind of input information or output information represents signal status of said media input means or said information output means, the interpretation result information represents a next event of the apparatus;

control rule memory means for previously storing a plurality of rules consisting of the present status information, an event condition information, an action information, a next status information, wherein the event condition information corresponds to the interpretation result information of said interpretation rule memory means, the action information represents processing list to execute, the next status information represents a next desired status of the apparatus; and control means for searching the interpretation result information from the interpretation rule memory means based on the present status of the apparatus as the present status information, the user's gaze object as the gaze object information, the signal status of said media input means or said information output means as the kind of input information or output information when the user's gaze object is detected by said gaze object detection means, for searching the action information and the next status information from the control rule memory means based on the present status of the apparatus as the present status information and the interpretation result information as the event condition information if the interpretation result information is retrieved from said interpretation rule memory means, for controlling said media input means to execute at least one of start, end, interruption, restart of input processing based on the action information, for controlling said personified image presentation means to display the agent image whose gesture and looks represent a reception or a completion of the user's input in synchronization with the input processing of said media input means, and for controlling a least one of start, end, interpretation, restart of the at least one medium outputted by said information output means based on the action information.

2. The multi-modal interface apparatus according to claim 1, further comprising an attention calling means for calling the user's attention through said personified image presentation means or said information output means, wherein said control means controls said attention calling means to call the user's attention based on the kind of the user's gaze object when said information output means outputs the at least one medium to the user.

3. The multi-modal interface apparatus according to claim 2, further comprising a reaction detection means for detecting the user's reaction in response to the calling of said attention calling means based on the user's gaze object or the inputted media from said media input means, wherein said control means controls at least one activation of said information output means and said attention calling means based on the user's reaction.

4. The multi-modal interface apparatus according to claim 1, wherein said control means executes processing of calling the user's attention based on the action information through at least one of said personified image presentation means and said information output means, and updates the present status of the apparatus based on the next status information, if the action information and the next status information are retrieved from said control rule memory means.

5. The multi-modal interface apparatus according to claim 1, wherein said control means searches the action information and the next status information from the control rule memory means based on the present status of the apparatus as the present status information and a control signal as the event condition information, if the control signal is outputted from said control means to at least one means.

6. The multi-modal interface apparatus according to claim 5, wherein said control means executes processing of calling the user's attention based on the action information through at least one of said personified image presentation means and said information output means, and updates the present status of the apparatus based on the next status information, if the action information and the next status information are retrieved from said control rule memory means.

7. A multi-modal interface method, comprising the steps of:

detecting a user's gaze object;

inputting at least one medium of sound information, character information, image information and operation information from the user;

displaying an agent image to the user, the agent image expressing predetermined gesture and looks as non-language message, the predetermined gesture and the looks being different based on a kind of the user's gaze object;

outputting at least one medium of sound information, character information and image information to the user;

storing a plurality of rules consisting of a present status information, a gaze object information, a kind of input information or output information, an interpretation result information in an interpretation rule memory, wherein the present status information represents a status of the apparatus, the gaze object information represents the kind of the user's gaze object, the kind of input information or output information represents signal status of a media input means or an information output means, the interpretation result information represents a next event of the apparatus;

storing a plurality of rules consisting of the present status information, an event condition information, an action information, a next status information in a control rule memory, wherein the event condition information corresponds to the interpretation result information of the interpretation rule memory, the action information represents processing list to execute, the next status information represents a next desired status of the apparatus;

searching the interpretation result information from said interpretation rule memory based on the present status of the apparatus as the present status information, the user's gaze object as the gaze object information, the signal status of said media input means or said information output means as the kind of input information or output information, when the user's gaze object is detected by said detecting step;

searching the action information and the next status information from said control rule memory based on the present status of the apparatus as the present status information and the interpretation result information as the event condition information, if the interpretation result information is retrieved from said interpretation rule memory;

controlling the input processing to execute at least one of start, end, interpretation, restart based on the action information;

controlling the gesture and looks of the agent image to represent a reception or a completion of the user's input in synchronization with the input processing; and controlling at least one of start, end, interruption, restart of the at least one medium outputted by said information output means based on the action information.

8. A computer readable memory containing computer readable instructions, comprising:

instruction means for causing a computer to detect a user's gaze object;

instruction means for causing a computer to input at least one medium of sound information, character information, image information and operation information from the user;

instruction means for causing a computer to display an agent image to the user, the agent image expressing predetermined gesture and looks as non-language message, the predetermined gesture and the looks being different based on a kind of the user's gaze object;

instruction means for causing a computer to output at least one medium of sound information, character information and image information to the user;

instruction means for causing a computer to store a plurality of rules consisting of a present status information, a gaze object information, a kind of input information or output information, an interpretation result information in an interpretation rule memory, wherein the present status information represents a status of the apparatus, the gaze object information represents the kind of the user's gaze object, the kind of input information or output information represents signal status of a media input means or an information output means, the interpretation result information represents a next event of the apparatus;

instruction means for causing a computer to store a plurality of rules consisting of the present status information, an event condition information, an action information, a next status information in a control rule memory, wherein the event condition information corresponds to the interpretation result information of the interpretation rule memory, the action information represents processing list to execute, the next status information represents a next desired status of the apparatus;

instruction means for causing a computer to search the interpretation result information from said interpretation rule memory based on the present status of the apparatus as the present status information, the user's gaze object as the gaze object information, the signal status of said media input means or said information output means as the kind of input information or output information, when the user's gaze object is detected by said detection means;

instruction means for causing a computer to search the action information and the next status information from said control rule memory based on the present status of the apparatus as the present status information and the interpretation result information as the event condition information, if the interpretation result information is retrieved from said interpretation rule memory;

instruction means for causing a computer to control the input processing to execute at least one of start, end, interruption, restart based on the action information;

instruction means for causing a computer to control the gesture and looks of the agent image to represent a reception or a completion of the user's input in synchronization with the input processing; and instruction means for causing a computer to control at least one of start, end, interruption, restart of the at least one medium outputted by said information output means based on the action information.

9. Multi-modal interface apparatus, comprising:

image input means for inputting a user's image including face and hand;

recognition means for extracting the face and hand from the user's image, and for recognizing a face position as the user's view position, a finger end position as the user's gesture part, and a reference object pointed by the finger end as the user's gesture input in a world coordinate space;

a location information memory means for storing a representative position and a direction by unit of a label information in the world coordinate space, wherein the label information is one of a presentation position of a personified image, the face, the finger end and the reference object, a plurality of the presentation positions being predetermined, the face, the finger end and the object being recognized by said recognition means;

control means for deciding a visual relation between the presentation position and the user's recognized position by referring to said location information memory means, wherein the user's recognized position includes the face position and the finger end position, and for generating the personified image expressing at least one of looks and action based on the visual relation; and personified image presentation means for presenting the personified image at the presentation position to the user as a feedback information of the gesture input;

wherein said control means decides whether the user's gesture part is watched from a current presentation position of the personified image and whether the personified image is watched from the user's view position, and generates the personified image which gazes the user's gesture part if the user's gesture part is watched from the current presentation position of the personified image and the personified image is watched from the user's view position.

10. The multi-modal interface apparatus according to claim 9, wherein said control means searches other presentation position where the user's gesture part is watched from the other presentation position of the personified image and the personified image is watched from the user's view position by referring to said location information memory means, if the user's gesture part is not watched from the current presentation position of the personified image or the personified image of the current presentation position is not watched from the user's view position.

11. The multi-modal interface apparatus according to claim 10, wherein said control means moves the personified image from the current presentation position to the other presentation position, if the other presentation position is found in said location information memory means.

12. The multi-modal interface apparatus according to claim 11, wherein said control means generates the personified image whose looks represents a reception of the user's gesture input, if the other presentation position is not found in said location information memory means.

13. The multi-modal interface apparatus according to claim 12, wherein said control means generates the personified image whose looks represents an analysis failure of the user's gesture input, if the user's gesture part is positioned outside a view area of said image input means.

14. The multi-modal interface apparatus according to claim 13, wherein said control means decides whether the reference object of the gesture input is watched from the presentation position of the personified image and whether the personified image is watched from the user's view position, if the gesture input is a pointing gesture.

15. The multi-modal interface apparatus according to claim 14, wherein said control means generates the personified image who gazes the reference object, if the reference object is watched from the presentation position of the personified image and the personified image is watched from the user's view position.

16. A multi-modal interface method, comprising the steps of:

inputting a user's image including face and hand;

extracting the face and hand from the user's image;

recognizing a face position as the user's view position, a finger end position as the user's gesture part, and a reference object pointed by the finger end as the user's gesture input in a world coordinate space;

storing a representative position and a direction as location information by unit of a label information in the world coordinate space, wherein the label information is one of a presentation position of a personified image, the face, the finger end and the reference object, a plurality of the presentation positions being predetermined, the face, the finger end and the reference object being recognized by said recognition step;

deciding a visual relation between the presentation position and the user's recognized position by referring to the location information, wherein the user's recognized position includes the face position and the finger end position;

generating the personified image expressing at least one of looks and action based on the visual relation; and presenting the personified image at the presentation position to the user as a feedback information of the gesture input;

wherein said deciding step includes the step of:
deciding whether the user's gesture part is watched from a current presentation position of the personified image and whether the personified image is watched from the user's view position; and wherein said generating step includes the step of:
generating the personified image which gazes the user's gesture part if the user's gesture part is watched from the current presentation position of the personified image and the personified image is watched from the user's view position.

17. The multi-modal interface method according to claim 16, wherein said step of deciding further comprises searching an other presentation position where the user's gesture part is watched from the other presentation position of the personified image and the personified image is watched from the user's view position by referring to said location information, if the user's gesture part is not watched from the current presentation position of the personified image or the personified image of the current presentation position is not watched from the user's view position.

18. The multi-modal interface method according to claim 17, wherein said step of deciding further comprises moving the personified image from the current presentation position to the other presentation position, if the other presentation position is found in said location information.

19. The multi-modal interface method according to claim 18, wherein said step of deciding further comprises generating the personified image having looks representing a reception of the user's gesture input, if the other presentation position is not found in said location information.

20. The multi-modal interface method according to claim 19, wherein said deciding further comprises generating the personified image having looks representing an analysis failure of the user's gesture input, if the user's gesture part is positioned outside a view area of said user's image.

21. The multi-modal interface method according to claim 20, wherein said step of deciding further comprises determining whether the reference object of the gesture input is watched from the presentation position of the personified image and whether the personified image is watched from the user's view position, if the gesture input is a pointing gesture.

22. The multi-modal interface method according to claim 21, wherein said step of deciding further comprises generating the personified image which gazes the reference object, if the reference object is watched from the presentation position of the personified image and the personified image is watched from the user's view position.

23. A computer readable memory containing computer readable instructions, comprising:

instruction means for causing a computer to input a user's image including face and hand;

instruction means for causing a computer to extract the face and hand from the user's image;

instruction means for causing a computer to recognize a face position as the user's view position, a finger end position as the user's gesture part, and a reference object pointed by the finger end as the user's gesture input in a world coordinate space;

instruction means for causing a computer to store a representative position and a direction as location information by unit of a label information in the world coordinate space, wherein the label information is one of a presentation position of a personified image, the face, the finger end and the reference object, a plurality of the presentation positions being predetermined, the face, the finger end and the reference object being recognized by said recognition means;

instruction means for causing a computer to decide a visual relation between the presentation position and the user's recognized position by referring to the location information, wherein said user's recognized position includes the face position and the finger end position;

instruction means for causing a computer to generate the personified image expressing at least one of looks and action based on the visual relation; and instruction means for causing a computer to present the personified image at the presentation position to the user as a feedback information of the gesture input;

wherein said instruction means for causing a computer to decide further comprises instruction means for causing a computer to decide whether the user's gesture part is watched from a current presentation position of the personified image and whether the personified image is watched from the user's view position, and wherein said instruction means for causing a computer to generate further comprises instruction means for causing a computer to generate the personified image which gazes the user's gesture part if the user's gesture part is watched from the current presentation position of the personified image and the personified image is watched from the user's view position.

24. The computer readable memory according to claim 23, wherein said instruction means for causing a computer to decide further comprises instruction means for causing a computer to search other presentation position where the user's gesture part is watched from the other presentation position of the personified image and the personified image is watched from the user's view position by referring to said location information, if the user's gesture part is not watched from the current presentation position of the personified image or the personified image of the current presentation position is not watched from the user's view position.

25. The computer readable memory according to claim 24, wherein said instruction means for causing a computer to decide further comprises instruction means for causing a computer to move the personified image from the current presentation position to the other presentation position, if the other presentation position is found in said location information.

26. The computer readable memory according to claim 25, wherein said instruction means for causing a computer to decide further comprises instruction means for causing a computer to generate the personified image having looks representing a reception of the user's gesture input, if the other presentation position is not found in said location information.

27. The computer readable memory according to claim 26, wherein said instruction means for causing a computer to decide further comprises instruction means for causing a computer to generate the personified image having looks representing an analysis failure of the user's gesture input, if the user's gesture part is positioned outside a view area of said user's image.

28. The computer readable memory according to claim 27, wherein said instruction means for causing a computer to decide further comprises instruction means for causing a computer to determine whether the reference object of the gesture input is watched from the presentation position of the personified image and whether the personified image is watched from the user's view position, if the gesture input is a pointing gesture.

29. The computer readable memory according to claim 28, wherein said instruction means for causing a computer to decide further comprises instruction means for causing a computer to generate the personified image which gazes the reference object, if the reference object is watched from the presentation position of the personified image and the personified image is watched from the user's view position.

* * * * *

UNITED STATES PATENT AND TRADEMARK OFFICE
CERTIFICATE OF CORRECTION

PATENT NO. : 6,118,888  
APPLICATION NO. : 09/030213  
DATED : September 12, 2000  
INVENTOR(S) : Shyam S. Mohapatra et al.

Page 1 of 1

It is certified that error appears in the above-identified patent and that said Letters Patent is hereby corrected as shown below:

Title page, item (75) should read as follows:
--Inventors: Shyam S. Mohapatra, Tampa, FL (US); Mukesh Kumar, Norwood MA (US); Shua-ku Huang, Towson, MD (US); Kam Leong, Ellicott City, MD (US); Aruna K. Behera, Watertown, MA (US); Li-Chen Chen, Taipei (TW); Cristina Perez de la Cruz, Bowie, MD (US)--.

Column 11,
Line 12, "Anti-rsv" should read --Anti-RSV--.

Signed and Sealed this

Tenth Day of March, 2009

JOHN DOLL  
*Acting Director of the United States Patent and Trademark Office*